United States Patent [19]

Goska et al.

[11] Patent Number: 5,659,470

[45] Date of Patent: Aug. 19, 1997

[54] COMPUTERIZED MONITORING MANAGEMENT SYSTEM FOR LOAD CARRYING VEHICLE

[75] Inventors: Walter J. Goska, Portland, Oreg.; Joseph Y. Muller, Kirkland, Wash.; Dennis W. Gaibler, Gresham; David Thompson, Portland, both of Oreg.; Donald A. Lawe, Carnation; Michael M. Van Schoiack, Issaquah, both of Wash.

[73] Assignee: Atlas Copco Wagner, Inc., Stockholm, Sweden

[21] Appl. No.: 344,818

[22] Filed: Nov. 23, 1994

Related U.S. Application Data

[63] Continuation-in-part of Ser. No. 240,371, May 10, 1994, abandoned.

[51] Int. Cl.⁶ .......................... G01G 19/08; G01G 19/40
[52] U.S. Cl. .......................... 364/424.04; 364/424.07; 364/567; 177/141
[58] Field of Search .................... 364/424.04, 424.03, 364/551.02, 567, 563, 424.07; 177/141, 25.14

[56] References Cited

U.S. PATENT DOCUMENTS

| | | | |
|---|---|---|---|
| 4,035,621 | 7/1977 | Kemp | 364/424.04 |
| 4,258,421 | 3/1981 | Juhasz et al. | 364/424.04 |
| 4,296,409 | 10/1981 | Whitaker et al. | 340/684 |
| 4,831,539 | 5/1989 | Hagenbuch | 364/449 |
| 4,839,835 | 6/1989 | Hagenbuch | 364/567 |
| 4,845,648 | 7/1989 | Hagenbuch | 364/567 |
| 4,854,406 | 8/1989 | Appleton et al. | 177/141 |
| 4,919,222 | 4/1990 | Krytsos et al. | 177/141 |
| 4,949,263 | 8/1990 | Jurca | 364/424.07 |
| 5,065,326 | 11/1991 | Sahm | 364/424.07 |
| 5,079,727 | 1/1992 | Yasue et al. | 364/552 |
| 5,105,896 | 4/1992 | Kyrtsos | 177/139 |
| 5,220,968 | 6/1993 | Weber | 177/25.14 |
| 5,250,761 | 10/1993 | Koyanagi | 177/141 |

FOREIGN PATENT DOCUMENTS

| | | |
|---|---|---|
| 110 399 A1 | 6/1984 | European Pat. Off. . |
| 334 959 A1 | 4/1989 | European Pat. Off. . |
| 398 809 A1 | 11/1990 | European Pat. Off. . |
| 59-084119 | 5/1984 | Japan . |
| 60-080721 | 5/1985 | Japan . |

*Primary Examiner*—Kevin J. Teska
*Assistant Examiner*—Tan Nguyen
*Attorney, Agent, or Firm*—Klarquist Sparkman Campbell Leigh & Whinston, LLP

[57] ABSTRACT

A computerized monitoring system is provided for sensing, displaying and storing a plurality of vehicle parameters for determining efficiency and to provide a detailed history of the vehicle throughout a work shift. The system is primarily intended for use on vehicles that carry heavy payloads many times a day such as are used in mining and general off-road, heavy-duty construction. The system incorporates up to 40 sensors to monitor vehicle parameters such as payload weight fluid temperatures, fluid pressures, fluid levels, shift position, direction of vehicle motion and vehicle speed. The system is provided with a display for showing the information to a vehicle operator. In addition, a central processing unit monitors the sensors and continuously compares the sensor output against predetermined maximum and minimum levels which indicate a "normal" range of operation. The system is initialized by a computer card that must be inserted into a card reader. In addition to initializing the system, the card provides an operator identification and provides memory to store the vehicle parameters that are generated by the sensors during an entire work shift.

22 Claims, 22 Drawing Sheets

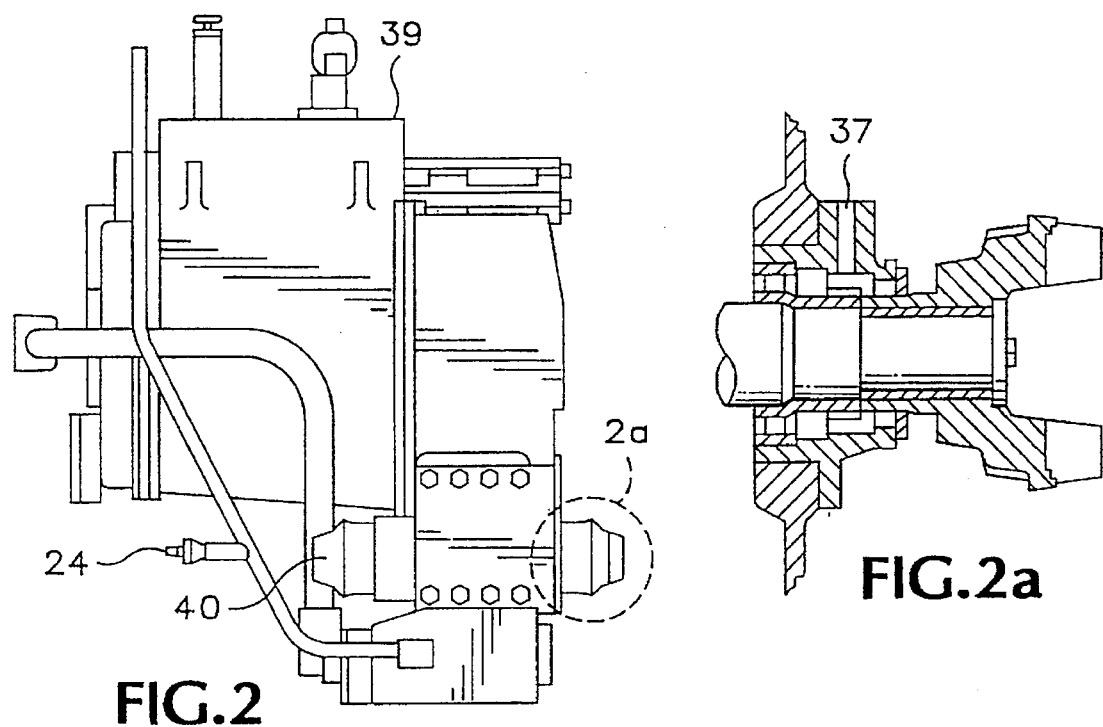
FIG.2
FIG.2a
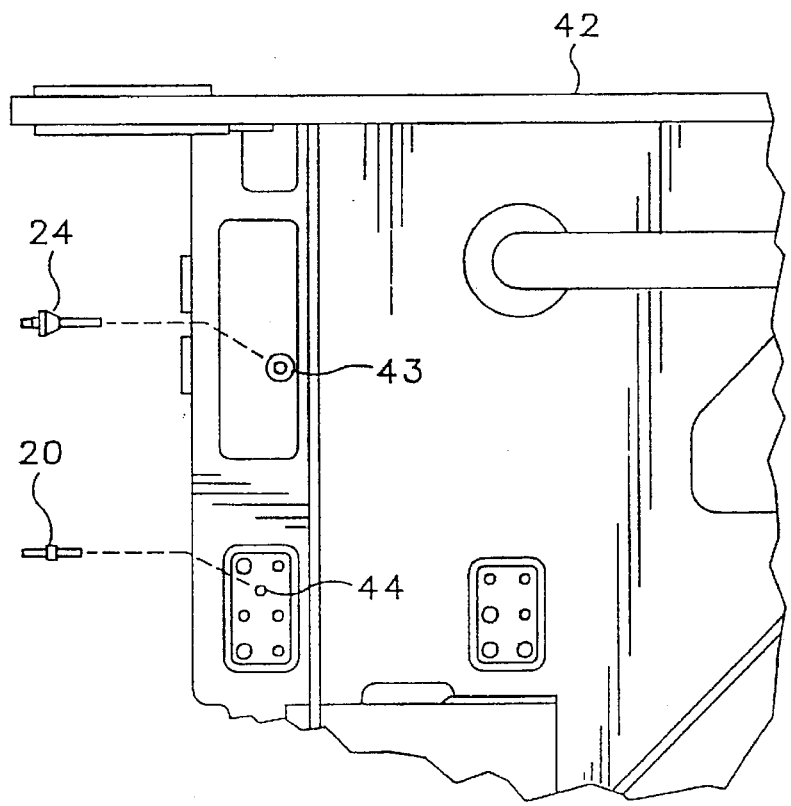
FIG.3

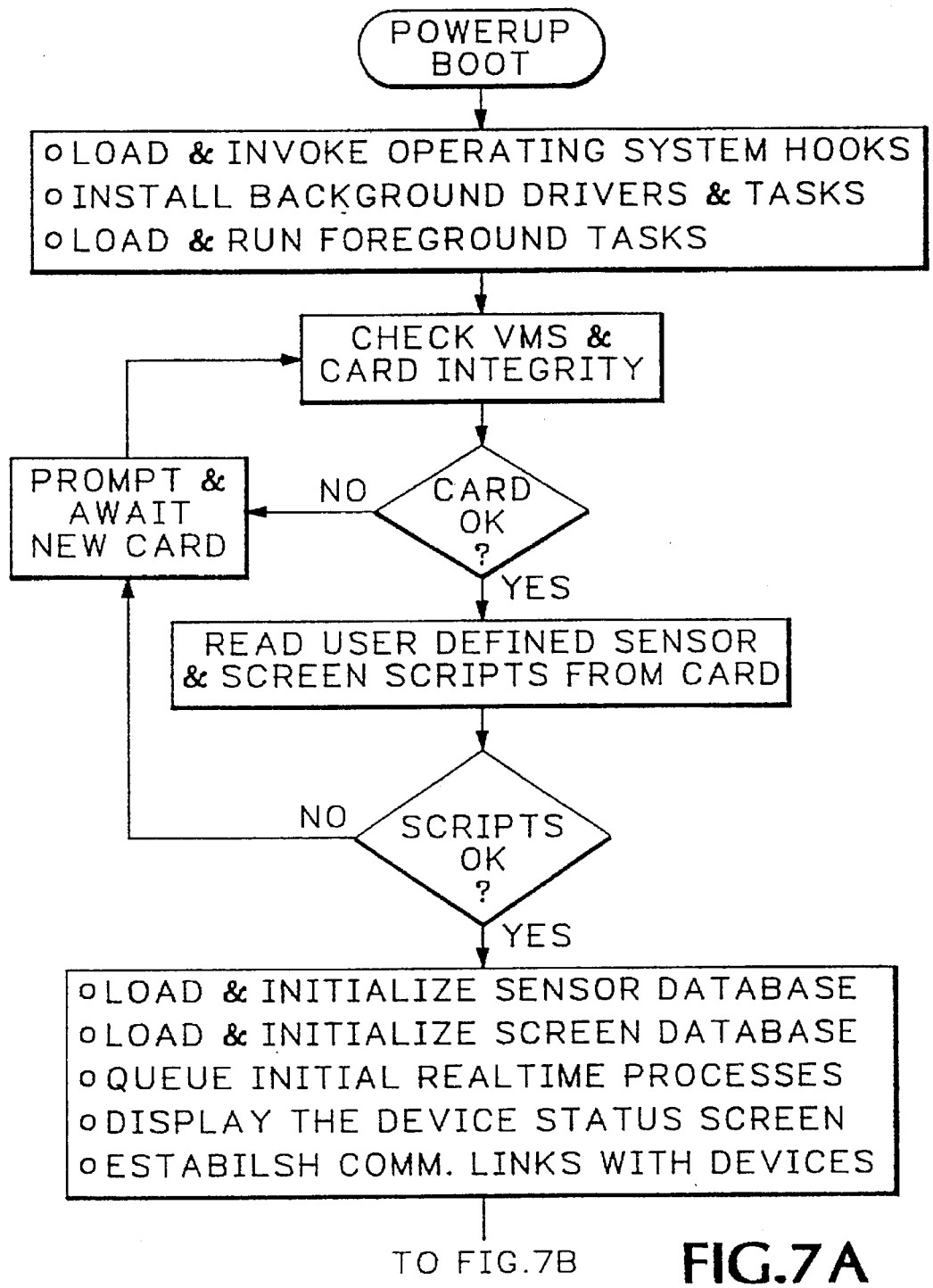
TO FIG.7B    FIG.7A

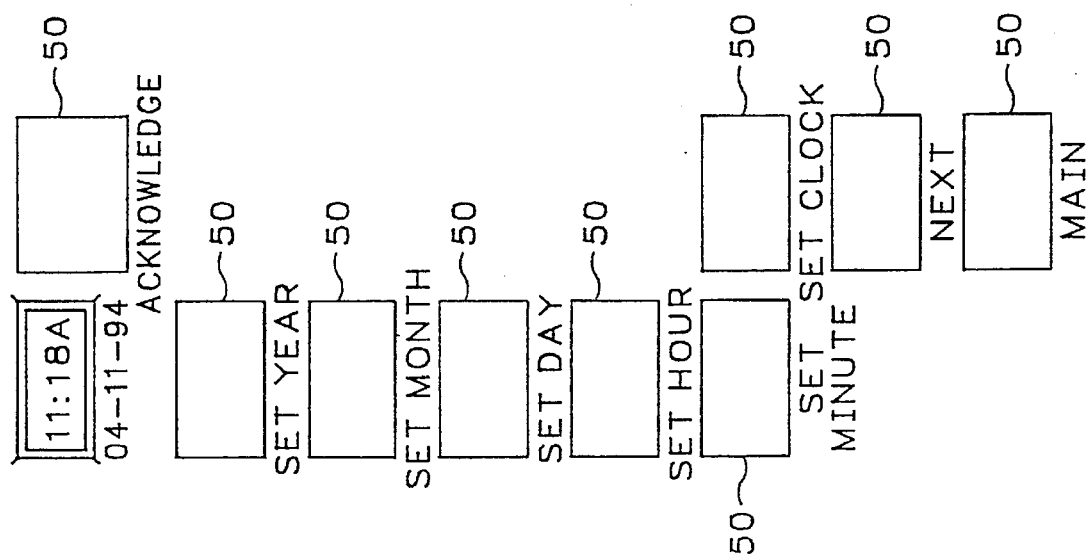
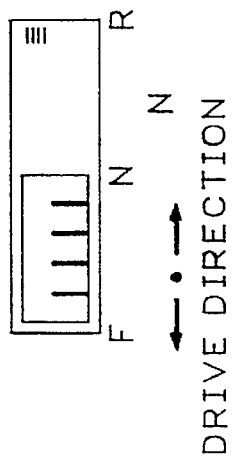
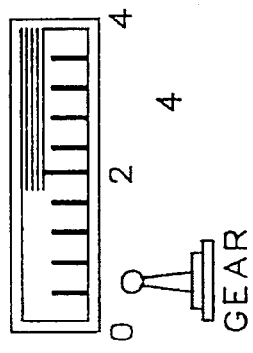
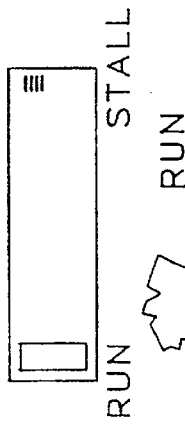
FIG.15

COMPUTERIZED MONITORING MANAGEMENT SYSTEM FOR LOAD CARRYING VEHICLE

CROSS-REFERENCE TO RELATED APPLICATIONS

This application is a continuation-in-part of U.S. patent application Ser. No. 08/240,371 filed May 10, 1994, now abandoned.

BACKGROUND OF THE INVENTION

1. Field of the Invention

This invention pertains to electronic monitoring of heavy equipment used in construction and mining and more particularly pertains to a data acquisition system that monitors several physical parameters of a heavy equipment vehicle, including payload weight, and displays the information for an operator, and stores the information to memory for later analysis of vehicle and operator efficiency and for vehicle diagnostics.

2. Description of the Related Art

Nearly all vehicles use sensors and instrumentation to monitor and display vehicle performance. Automobiles typically have real-time instrumentation for displaying vehicle speed, fuel level, and a plurality of warning lights that will illuminate if the engine exceeds certain predetermined physical parameters such as excessive engine heat or insufficient battery voltage.

A manufacturer of large diesel engines provides an electronic diesel control system which senses various diesel engine parameters such as throttle position, RPM, fuel consumption, barometric pressure, and fuel temperature. The electronic control system provides an electronic output from the sensors onto an industry standard bus known as a J1708 bus. Although the electronic control system provides sensor output for many aspects of the engine performance there is no provision for saving the data values of the sensors for later analysis nor is there any suggestion for providing other sensors to monitor physical parameters of the heavy equipment other than the engine.

Heavy equipment vehicles have a hydraulic system for articulating a dump body or loading bucket, knowledge of which is important to maintaining efficiency of the heavy equipment. Additional vehicle information includes distance traveled, rate of travel, payload carried, and time of operation. As such vehicles become more expensive and mining operations become more difficult, the need for improved information of the entire vehicle becomes more important.

Thus, there is a compelling need in the industry for a computer monitoring system for monitoring power-train and vehicle performance information that relates to the operation and efficiency of load-carrying vehicles in which the information is displayed for an operator and saved in memory for later use in diagnostics and efficiency calculations.

SUMMARY OF THE INVENTION

The present invention provides a plurality of sensors for monitoring vehicle parameters that are important to vehicle and operator efficiency such as power-train performance, the hydraulic system, shifter position, vehicle direction, speed, and payload weight. Each sensor outputs an electronic signal which is fed into a sensor manager that converts the signal into a correct format for output to a digital central processing unit (CPU) which in turn outputs the information to a real time display for use by a vehicle operator. The information is also stored in memory for later analysis. In addition, many of the vehicle and power-train parameters are monitored against predetermined threshold levels to ensure that they are within standard operating ranges.

A diagnostician may download the vehicle information from memory for display on a desktop computer. The diagnostician may simultaneously generate graphs of various vehicle parameters so that he or she may analyze the operation of the vehicle prior to, during, and after a system failure occurred. Also, the information may be downloaded from memory and analyzed for vehicle and operator efficiency.

A weighing system is provided for real-time weighing of payloads that are carried in a load-carrying vehicle, such as the applicants' SCOOPTRAM™. The weighing system may also be adapted to other haulage vehicles, such as load-carrying vehicles having dump bodies. The weighing system of the present invention comprises four sensors: a hoist position sensor, a stabilizer cylinder position sensor, and two hoist cylinder pressure sensors. The hoist position sensor is located at a pivot point of a boom of a payload bucket. The stabilizer cylinder position sensor is located in a protective housing on top of the stabilizer cylinder for sensing the amount of tilt of the payload bucket. The pressure sensors are attached to a base end and a rod end of the hoist cylinder. The pressure sensors send a pressure signal to a pressure transducer which converts the pressure signals into electrical signals, which are sent to the sensor manager. Thereafter, the central processing unit executes a computer program for manipulating the data from the sensors to provide payload data to a display for review by vehicle operator. The weighing system also includes a calibration program which can be executed to update various empirical data values that are used in the weighing program.

The CPU is also connected to an input device, preferably a card reader, which accepts a card having nonvolatile memory. Preferably, the card reader and card are configured in a PCMCIA computer standard. The card may be used to store the sensor information gathered by the data aquisition system during the operator's shift. By storing the information on a card that can be removed from the vehicle it will provide easy access to the data for analysis.

Preferably, the PCMCIA card contains information to initialize the monitoring system at start up. In addition, the card can contain information relating to the operator to ensure the operator has authorization to operate a particular piece of equipment for which access is being attempted. The card may also be programmed for operator training, or may be provided with operational information so that equipment operators may access that information in the event of problems or questions about the vehicle.

It is also anticipated that, in addition to the operator's access card discussed above, a PCMCIA card may be provided having a parts list or diagnostic instructions for assisting repair persons during the maintenance or repair of the vehicle.

The computer monitoring system may be enhanced by the addition of a transmitter or receiver for transmitting vehicle information or receiving haulage instructions. The system may be further enhanced by the addition of a proximity sensor and the use of various electromagnetic devices located within a job site so that a vehicle may be detected when it passes by one of the electromagnetic devices.

Various advantages and features of novelty which characterize the invention are particularized in the claims forming a part hereof. However, for a better understanding of the invention and its advantages, reference should be had to the drawings and to the accompanying description in which there is illustrated and described preferred embodiments of the invention.

BRIEF DESCRIPTION OF THE DRAWINGS

FIG. 2 is a schematic elevational view showing a preferred embodiment of a sensor mounted on a transmission.

FIG. 2a is an enlarged sectional view of area 2a in FIG. 2, showing a speedometer sensor port on the transmission of FIG. 2.

FIG. 3 is a schematic elevational view showing a preferred embodiment of sensors mounted on a hydraulic tank.

FIGS. 7a and 7b are a logic flow diagram of a main program used for booting the sensor manager and the CPU, and reading the sensors.

FIG. 15 is a preferred embodiment of a computer screen for communicating information to an operator of the vehicle regarding various devices used on the vehicle and also permitting the operator to adjust the computer and screen settings.

DETAILED DESCRIPTION OF THE PREFERRED EMBODIMENTS

Figure 1:
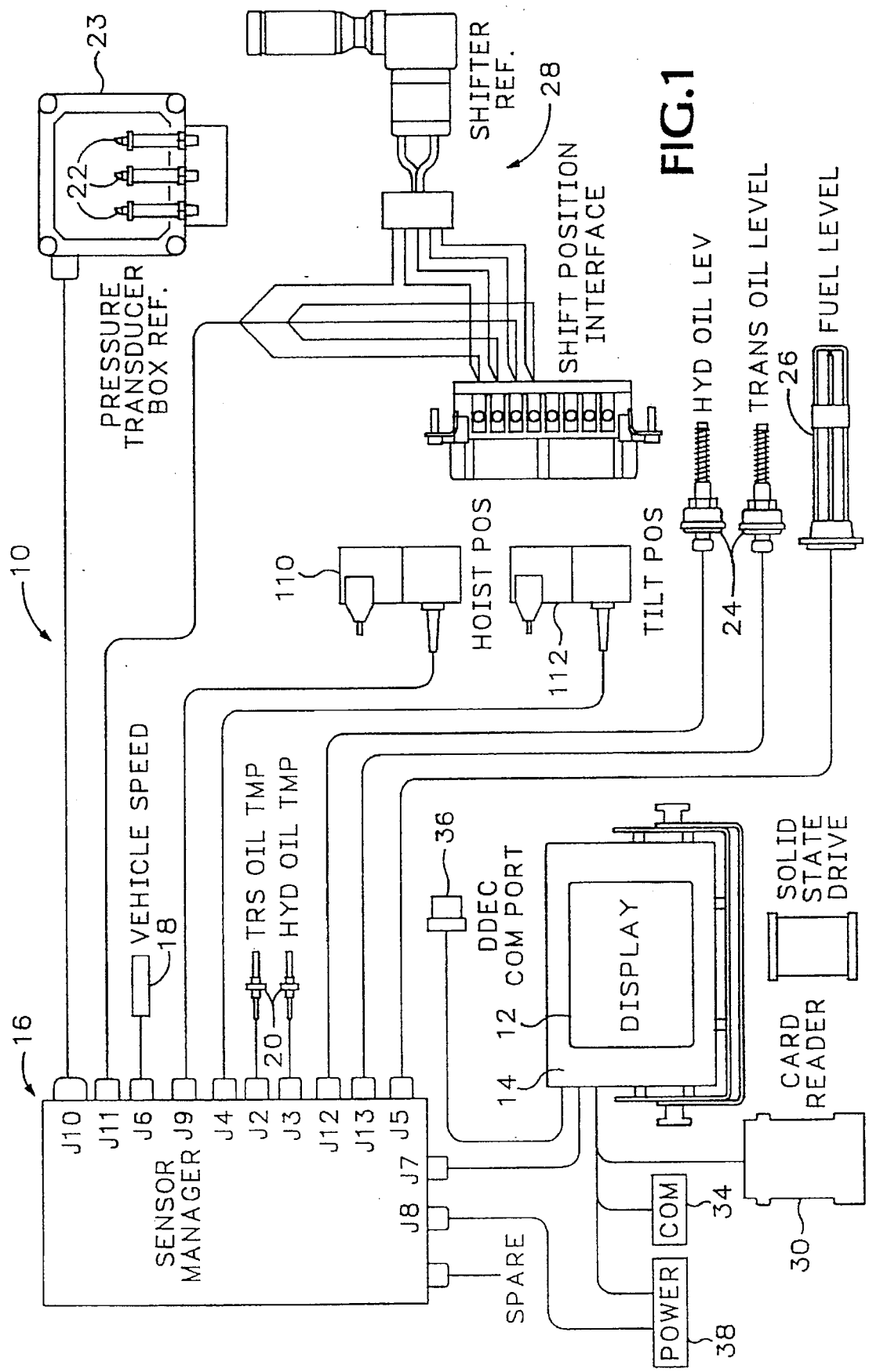
FIG. 1 is a schematic overview of the computer monitoring system of the present invention.

In FIG. 1 there is shown a schematic representation of a monitoring system 10 of the present invention. The system includes a display 12 which preferably is also a housing for a central processing unit (CPU) 14. The CPU is connected to the display 12, a sensor manager 16, a card reader 30 a power source 38 and various input/output (I/O) ports, such as a DDEC com port 36 and a generic com port 34.

The sensor manager 16 acts as a gate keeper between a plurality of sensors 18, 20, 22, 24, 26, 28, 110, and 112 and the CPU 14. Equipped with an internal clock, the sensor manager 16 interrogates the sensors according to a predetermined sample rate and converts the sensor output into digital format which is output to the CPU 14. In addition, the sensor manager 16 tests the sensors and performs a self-test on itself. The sensor manager 16 contains a sensor interface electronic module, EMI protection circuitry, power surge protection, a processor, communication ports, data logging memory, and a clock/calendar with battery backup and digital I/O ports. The preferred sensor manager 16 for the present invention is manufactured by the Vehicle Monitor Corporation of Redmond, Wash. The sensor manager 16 of the preferred embodiment has input/output capabilities for reading two magnetic sensors, forty analog inputs, a J1708 bus connector, four RS232 serial ports and 16 digital I/O ports.

Sensors

The preferred embodiment of the present invention incorporates sensors that are designed to have a self-test capability and compatibility with the sensor manager 16. However, almost any analog sensor having an analog output between 0 and 5 volts DC may be incorporated directly into the present invention.

Vehicle speed and engine RPM are typically measured with sensors 18 that are magnetic pickoff transducers. Self-test is accomplished by testing for the proper coil and wiring impedance.

Temperature is measured using resistance temperature sensors 20 having a temperature measurement accuracy of 1.5 percent. The temperature sensors 20 are mounted in an internally threaded ¼ inch pipe (not shown) for protection against environmental hazards.

Pressure is measured with pressure transducers 22 having a polysilicon deposited thin film strain gauge technology. The thin film technology is preferred over normal bonded strain gauge sensors because there is less bias shift over time and there is improved reliability in harsh environment conditions. The transducers have an accuracy of one percent and a temperature coefficient of 0.04 percent full scale/° F. for scale factor. The pressure transducers are mounted in a ¼ inch internally threaded pipe that is located in a pressure transducer box 23 to further limit the effect of environmental conditions. The box 23 also provides for a more logical installation of the pressure transducers by keeping them grouped together and reducing the number of pressure lines. Although only three pressure transducers 22 are shown in FIG. 1, the preferred embodiment of the box 23 accepts up to six transducers 22. The specific connection of the transducers 22 is described below.

Figure 22:
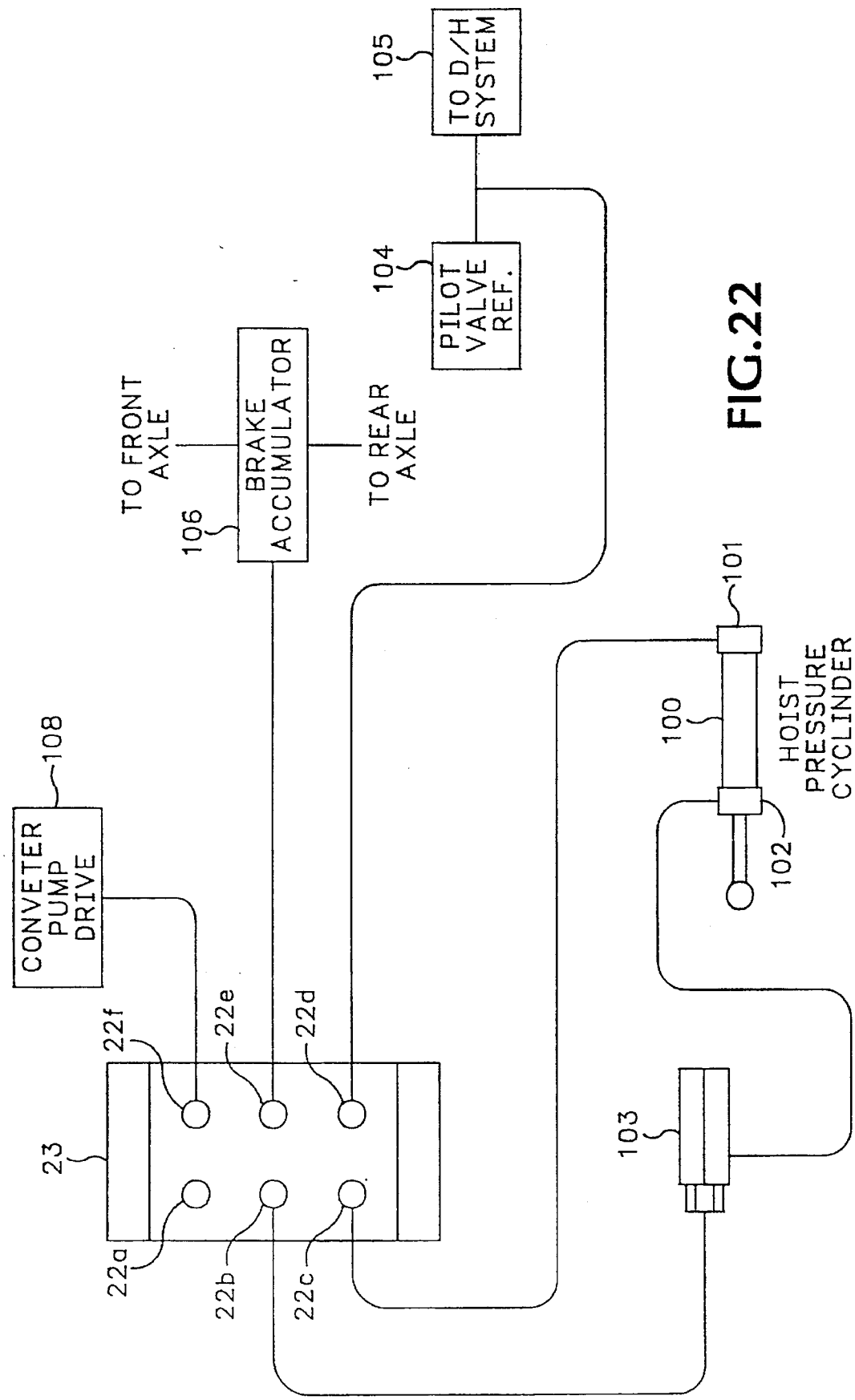
FIG. 22 is a schematic diagram showing a preferred embodiment of hydraulic lines for sensing vehicle parameters relating to hydraulic pressure.

FIG. 22 shows a schematic diagram illustrating the pressure transducers 22 in the pressure transducer box 23 and their connection to pressure devices for which pressure is sensed. A preferred embodiment includes six pressure transducers which are indicated as 22a–22f. In a preferred embodiment, 22a is a spare connection provided for future expansion of the system. Transducers 22b and 22c are connected to a hoist pressure cylinder 100, also shown in an environmental view in FIG. 19. Transducer 22c is connected to a base end 101 of the hoist cylinder 100, while transducer 22b is connected to a rod end 102 of the hoist cylinder. The connection between transducer 22b and the rod end 102 passes through a shunt pressure valve 103 which is intended to prevent high pressures in the rod end 102 of the hoist cylinder 100 from reaching the pressure transducer 22b in order to prevent damage to that transducer.

Pressure transducer 22d is connected to a pilot valve 104, which controls the high pressure hydraulic lines going to various system components, including a transmission shift control, a pressure adjustment valve, and a hydraulic tank. Transducer 22d is also connected to the hydraulic lines of the dump/haul ("D/H") system 105. Pressure transducer 22c is connected to a brake accumulator 106. Pressure transducer 22f is connected to a converter pump drive 108.

Fluid level sensors 24 are capacitive transducers. A fuel level sensor 26 is a variable resistance transducer.

The shift position interface 28 preferably connects to an electronic shifter and reads the shift position directly from the electronic signals provided by the shifter. Alternatively, pressure transducers could be used to detect shifting.

Figure 19:
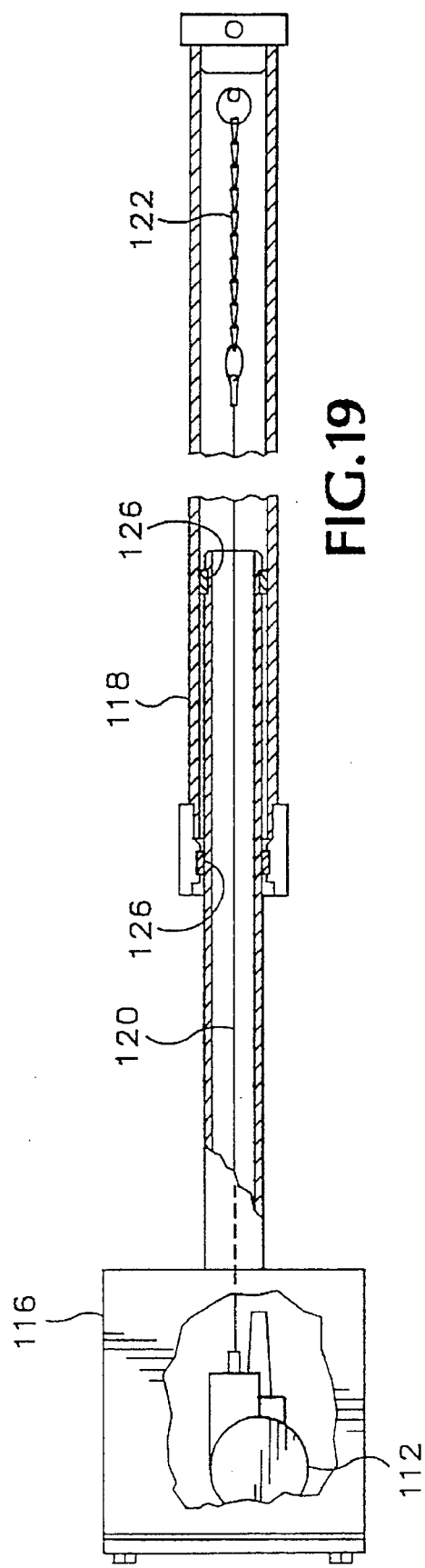
FIG. 19 is a top plan view of a preferred embodiment of a stabilizer cylinder position sensor enclosed in a protective housing.
Figure 20:
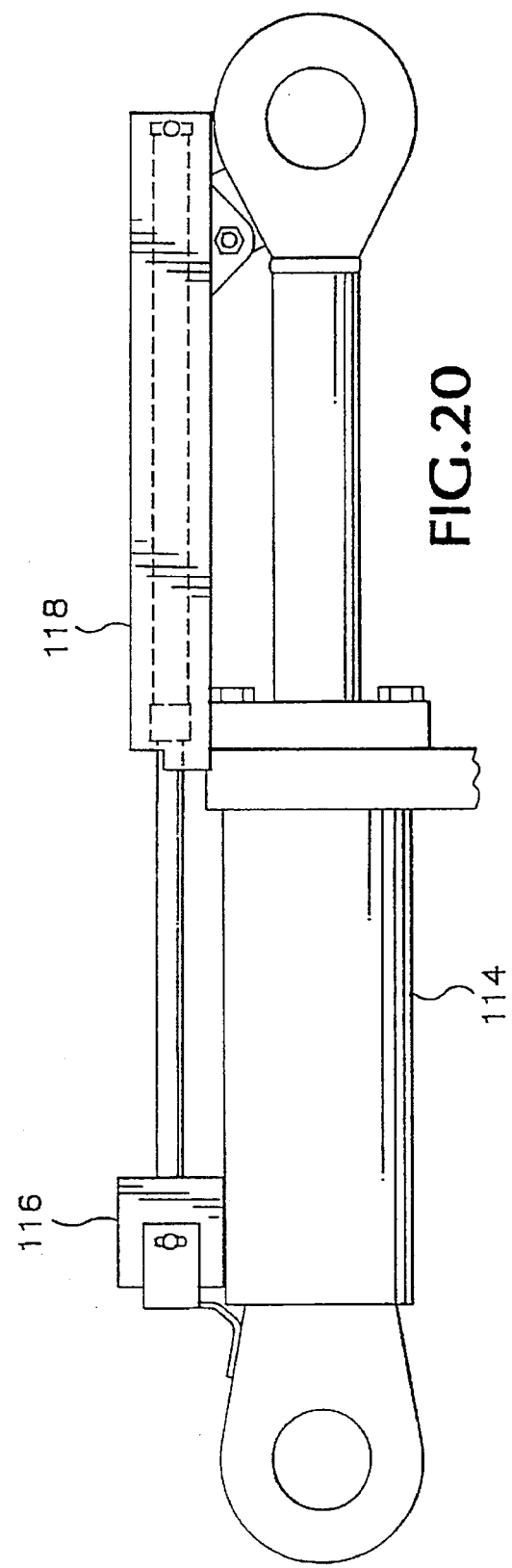
FIG. 20 is a side elevational view of a preferred embodiment of the stabilizer cylinder position sensor of FIG. 19 mounted atop a stabilizer cylinder.
Figure 21:
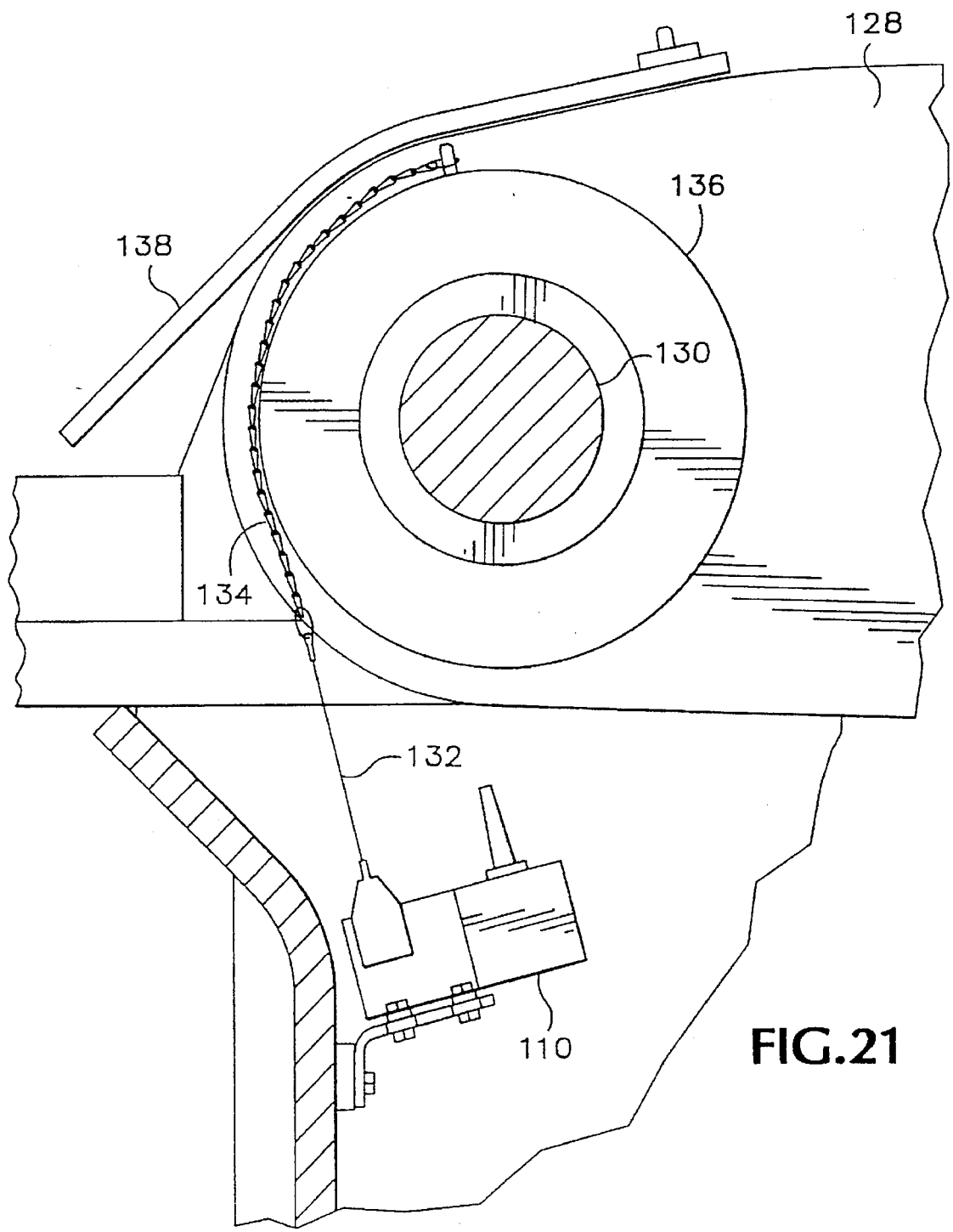
FIG. 21 is a side elevational view of a preferred embodiment of a position sensor connected to a portion of a hoist boom which is configured as shown in the exemplary load-carrying vehicle of FIG. 18.

The present invention also includes two position transducers 110 and 112, such as are available from Celesco Transducer Products, Inc. of Canoga Park, Calif. as part nos. PT8101-0020-121-1120 and PT8101-0040-111-1120, respectively. Sensor 110 is a hoist position sensor and is mounted as shown in FIG. 21 and more fully described below. Position sensor 112 is a sensor that detects tilt of a payload bucket 124 and is mounted on a stabilizer cylinder 114 as shown in FIGS. 19 and 20, and as further described below.

Figure 6:
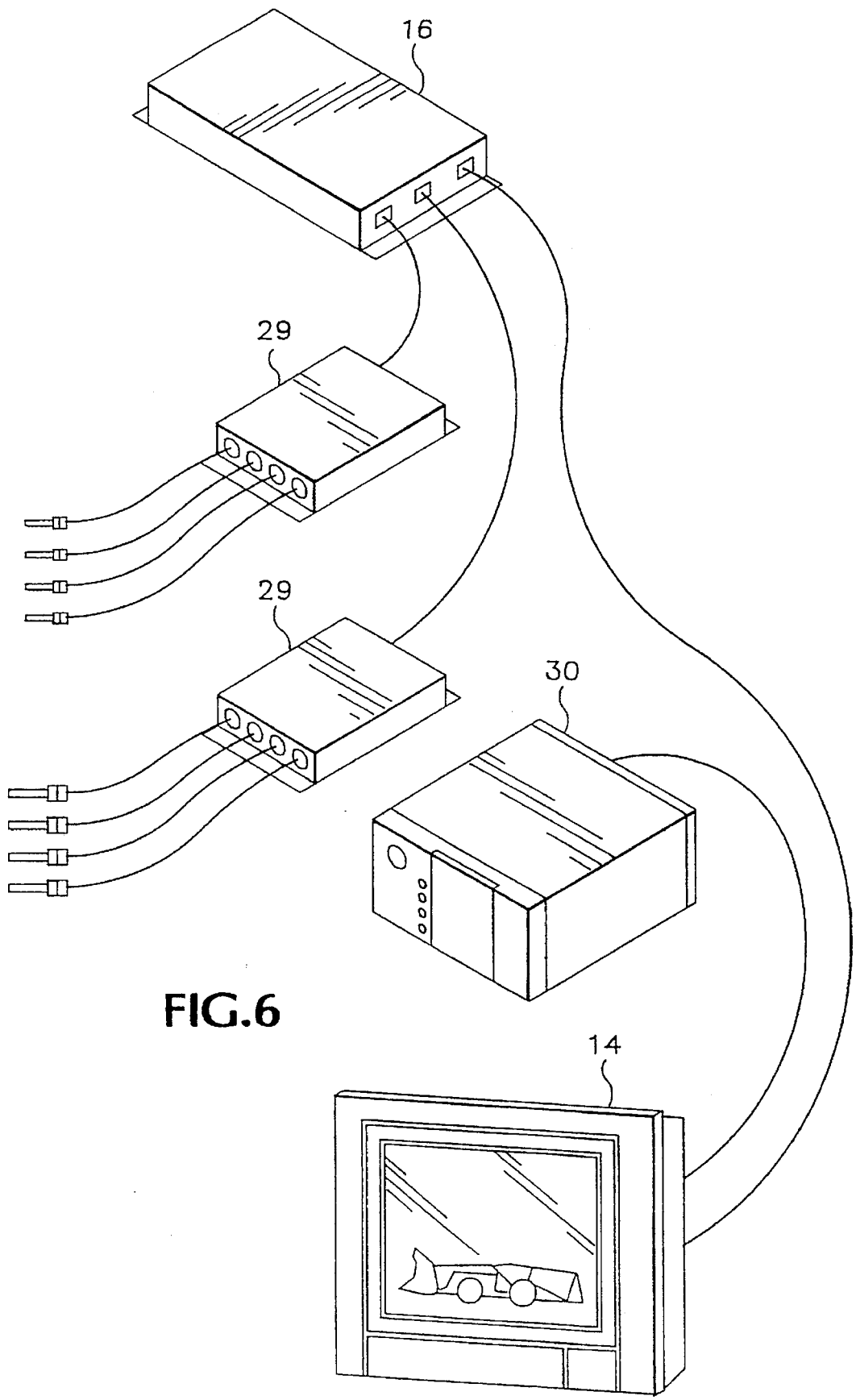
FIG. 6 is a diagrammatic view of an embodiment of the present invention.

FIG. 6 shows a preferred embodiment of the sensed parameters for a diesel engine vehicle. The system of FIG. 6 includes junction boxes 29 that are located between the sensor manager 16 and some sensors to eliminate wires and simplify mounting.

In the preferred embodiments of the present invention the following vehicle parameters are monitored by the computer monitoring system:

| Diesel Powered Vehicles | Electric Powered Vehicies |
|---|---|
| Engine | Motor |
| RPM | MPU Interface: |
| Oil Temperature | Temperature |
| Oil Pressure | Current |
| Change in Oil Pressure | Unbalance |
| Across the Filter | Overload |
| Oil Level | |

| Diesel Powered Vehicles | Electric Powered Vehicies |
|---|---|
| Transmission | Transmission |
| Oil Temperature | Oil Temperature |
| Oil Pressure | Oil Pressure |
| Speed | Speed |
| Clutch Pressures (6) | Clutch Pressures (6) |
| Oil Level | Oil Level |
| Hydraulic | Hydraulic |
| Oil Temperature | Oil Temperature |
| Steer Pressure | Steer Pressure |
| Hoist Pressure | Hoist Pressure |
| Brake Pressure | Brake Pressure |
| Brake Accumulator Pressure | Brake Accumulator Pressure |
| Oil Level | Oil Level |
| Other | Other |
| Atmospheric Temperature | Atmospheric Temperature |
| Fuel Level | Voltage |
| Payload Weight | Payload Weight |
| Future | Future |
| Tire Pressure | Tire Pressure |

Preferably, the wiring harness of the present invention incorporates wires having a urethane jacket and water tight connectors. Standard wiring harnesses manufactured by the Vehicle Monitoring Corporation, Redmond, Wash., are available for many applications. However, in the preferred embodiments of the present invention the wiring harness is custom manufactured for each different style of vehicle.

Card Reader

The CPU 14 has a plurality of output ports for connection to a plurality of peripheral devices including a card reader 30 that is preferably configured to accept cards 32 using the PCMCIA standard for I/O devices. The card 32 incorporates an initialization program that initializes the CPU and sensor manager and provides high and low sensor values to indicate a normal range of operation. When the card is placed in the card reader and a security door (not shown) is closed, the CPU will be activated and the system will be initialized.

Additionally, the card 32 can be configured to contain operator information, operator authorizations, and may also contain instruction manuals and help screens. The card is also provided with nonvolatile memory for storage of vehicle performance parameters as measured by the sensors. Optimally, enough memory is provided so that the card can store all of the sensor information logged during an entire work shift, even if a high sample rate is selected, thereby collecting many samples per minute.

The card 32 may also be configured to contain diagnostic programming and information to aid repair persons in diagnosing engine and vehicle performance problems. Additionally, the card 32 could contain a parts list for the vehicle and an expert system for diagnostics.

In the preferred embodiment of the present invention the card reader 30 is manufactured by Vehicle Monitoring Corporation of Redmond, Wash. and is available as part no. 6522-860-001. The cards 32 are industry standard PCMCIA II cards available from numerous manufactures.

The CPU 14 also has the capability of outputting its electronic signals to a serial communication port 34 which may be connected to an existing radio system (not shown) or an optional internal transceiver (not shown). By connecting the system to a radio transceiver it will be possible to transmit the sensor information and other vehicle parameters to a central receiving station. This communication ability would be particularly useful if the vehicle were equipped with proximity sensors and the work site were equipped with a plurality of magnetic sign posts such that when a vehicle equipped with a proximity sensor passes by a magnetic sign post the proximity sensor would be tripped thereby providing an approximation of the location of the vehicle within the work site.

The system also provides a J1708 bus connector (a DDEC com port) 36 for connecting to electrically controlled engines for monitoring engine performance.

Sensor Mounting

FIG. 2 shows a preferred location for mounting a transmission fluid level sensor 24 and a magnetic vehicle speed sensor 18. FIG. 2 shows a side view of a transmission 39 with an existing chamber 40 which may be configured to accept the fluid level sensor 24.

The vehicle speed sensor 18 is located at a sensor port 37 on the transmission 39, as shown enlarged in FIG. 3a. The sensor 18 is located to sense the rotational speed of an axle 41.

FIG. 3 shows a side elevational view of a hydraulic fluid tank 42 incorporated onto vehicles intended for load carrying and other heavy equipment uses. The hydraulic fluid level sensor 24 is located at location 43 and a hydraulic fluid temperature sensor 20 is located at position 44.

Figure 4:
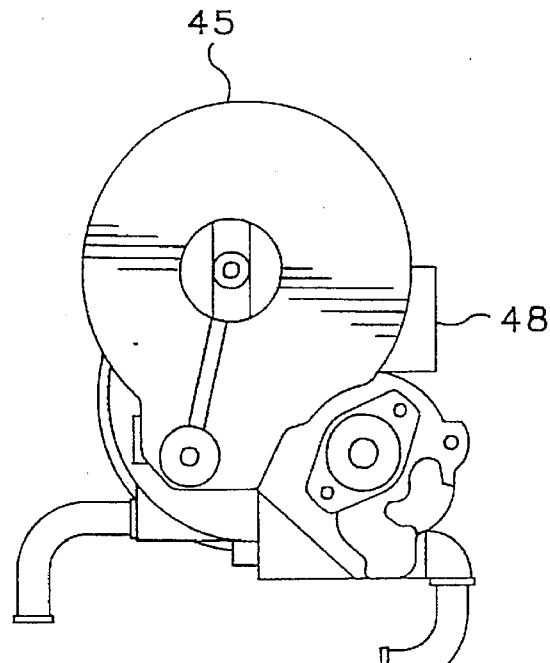
FIG. 4 is a schematic elevational view of a preferred embodiment of a sensor mounted on a torque converter.

FIG. 4 shows a side elevational view of a torque converter 45; a typical component of heavy equipment for which the present invention is intended. Preferably, the temperature sensor 20 is mounted at location 48 for measuring the fluid temperature within the torque converter where the fluid temperature is highest.

Figure 5:
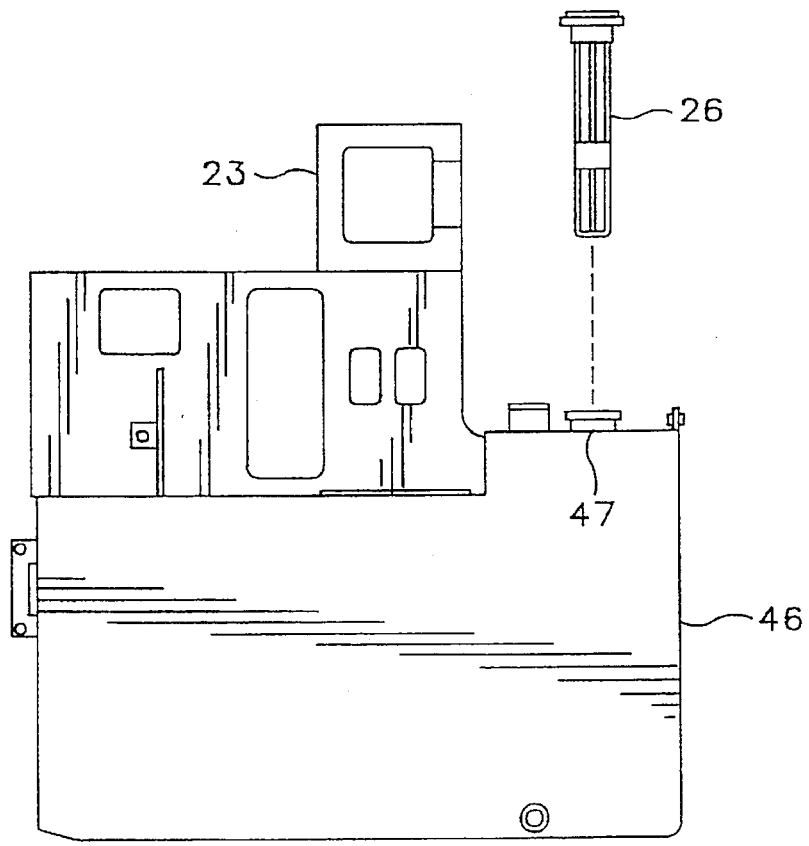
FIG. 5 is a schematic elevational view of a preferred embodiment of a sensor mounted on a fuel tank assembly.

FIG. 5 shows a side elevational view of a fuel tank 46 for use on heavy equipment for which the present invention is intended. A fuel level sensor 26 is shown located at position 47.

Figure 18:
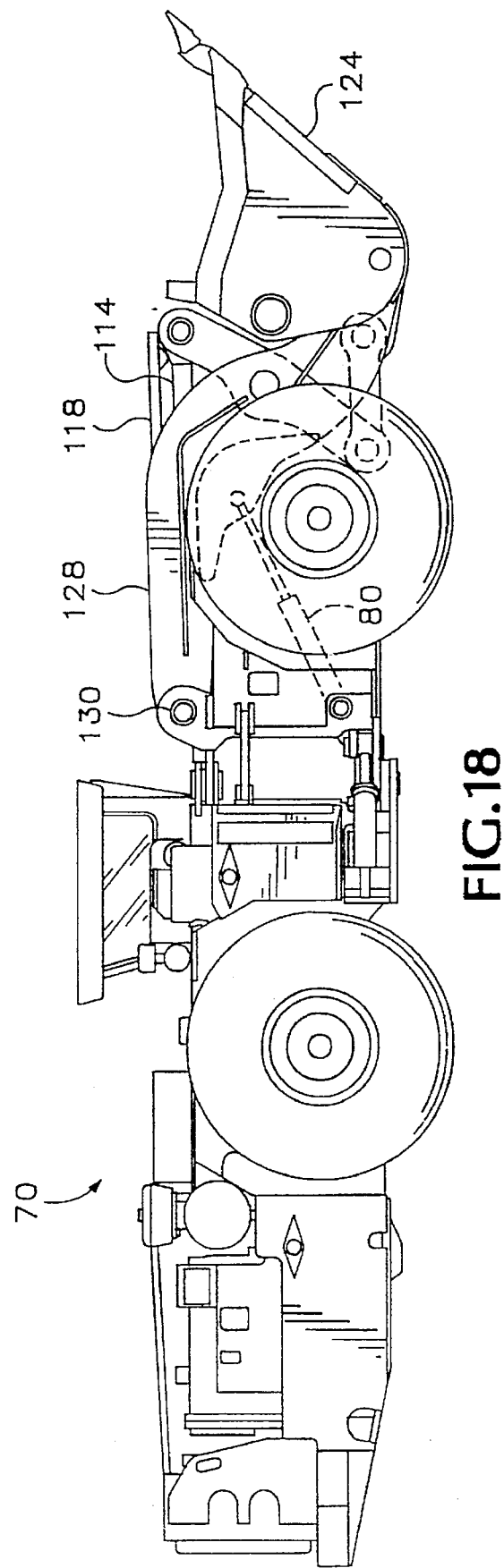
FIG. 18 shows an exemplary load-carrying vehicle showing a boom, a hoist cylinder in shadow outline, and a stabilizer cylinder for articulating a front payload bucket.

FIGS. 19 and 20 show the position sensor 112 attached to a stabilizer cylinder 114 which controls the tilt of a bucket on a load/haul/dump vehicle, such as is exemplararily shown in FIG. 18. Output from the sensor 112 is provided to the sensor manager 16, as shown in FIG. 1. The position sensor 112 is housed in a protective enclosure 116. A telescoping, protective enclosure 118 is provided for protecting a cable 120 that extends from the position sensor 112. The position sensor 112 provides an analog signal that is proportional to the amount of cable 120 that is extended from the sensor's housing. In a preferred embodiment of the present invention, the tilt sensor 112 is provided with a cable having a nominal displacement of approximately 40 inches. A cable chain 122 is provided to accommodate the length that is necessary to accommodate the full extension of the stabilizer. cylinder 114.

In a preferred embodiment, the tilt sensor 112 is used solely to determine whether or not a vehicle bucket 124 is untilted to hold a load or is tilted to dump a load. Thus, the tilt sensor 112 could be replaced by simple relay switch or two-state sensor that merely detects bucket tilt. However, the preferred embodiment provides the tilt position sensor 112 described above in order to provide further capabilities for future development of the present monitoring system. Most notable, having a variable sensor such as is described above will enable the system to provide further data for use with remote control mining vehicles.

The enclosures 116 and 118 are provided to protect the sensor 112 and its cable 120 from the hazardous environment experienced in mining operations. Seals 126 are provided along the telescoping enclosure 118 in order to further keep contaminants from entering the sensor system.

FIG. 21 shows the hoist position sensor 110 attached to a hoist boom 128 of a mining vehicle. In order to sense the position of the hoist boom 128, the sensor 110 is mounted near a boom pivot 130 and a sensor cable 132 is arranged partially about the pivot 130. Thus, as the boom 128 moves about its pivot 130, the sensor cable 132 is extended from, or retracted into, the sensor 110. An electrical signal is output from the sensor 110 that is proportional to the amount of cable extension. In a preferred embodiment, the sensor 110 uses a cable having a nominal length of approximately 20 inches. A cable chain 134 is connected to the cable 132 to extend along a hub 136 of the boom pivot 130. A protective cover 138 is provided to prevent debris and other contaminants from interfering with the sensor 110 and its cable 132 and chain 134.

Software Program

The computer monitoring system 10 of the present invention uses computer software for operating the CPU 14, sensor manager 16 and all I/O functions. A preferred embodiment of the present invention uses a computer software program entitled Vehicle Monitoring System ("VMS") that has been modified to read and process the sensors required for the particular types of vehicles for which the present invention is intended and to provide for the data manipulation necessary for the reports and data output that is useful for mining and heavy equipment vehicles.

Figure 7B:
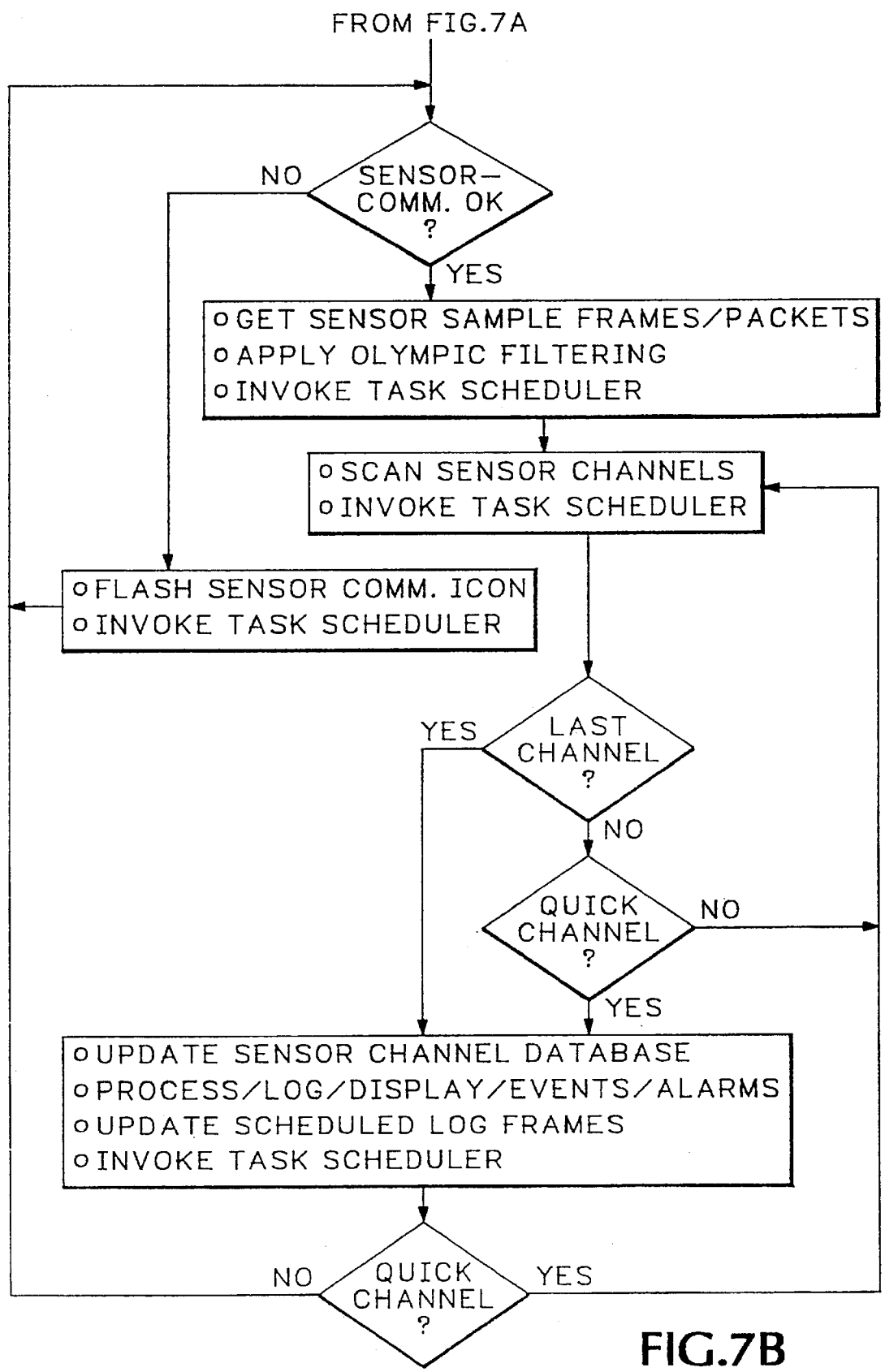
Figure 8:
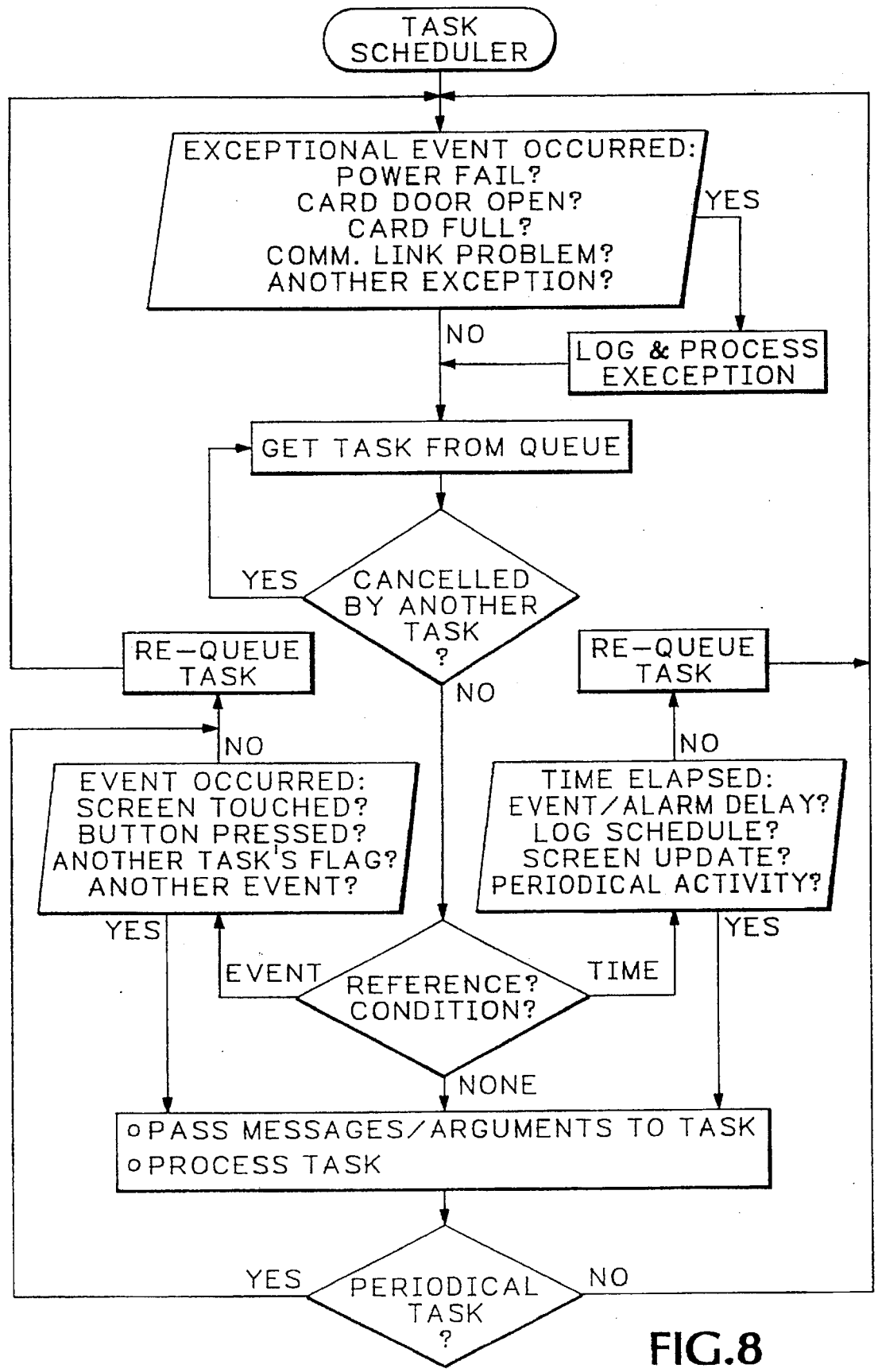
FIG. 8 is a logic flow diagram of a subroutine entitled Task Scheduler called by the main program shown in FIG. 7.
Figure 9:
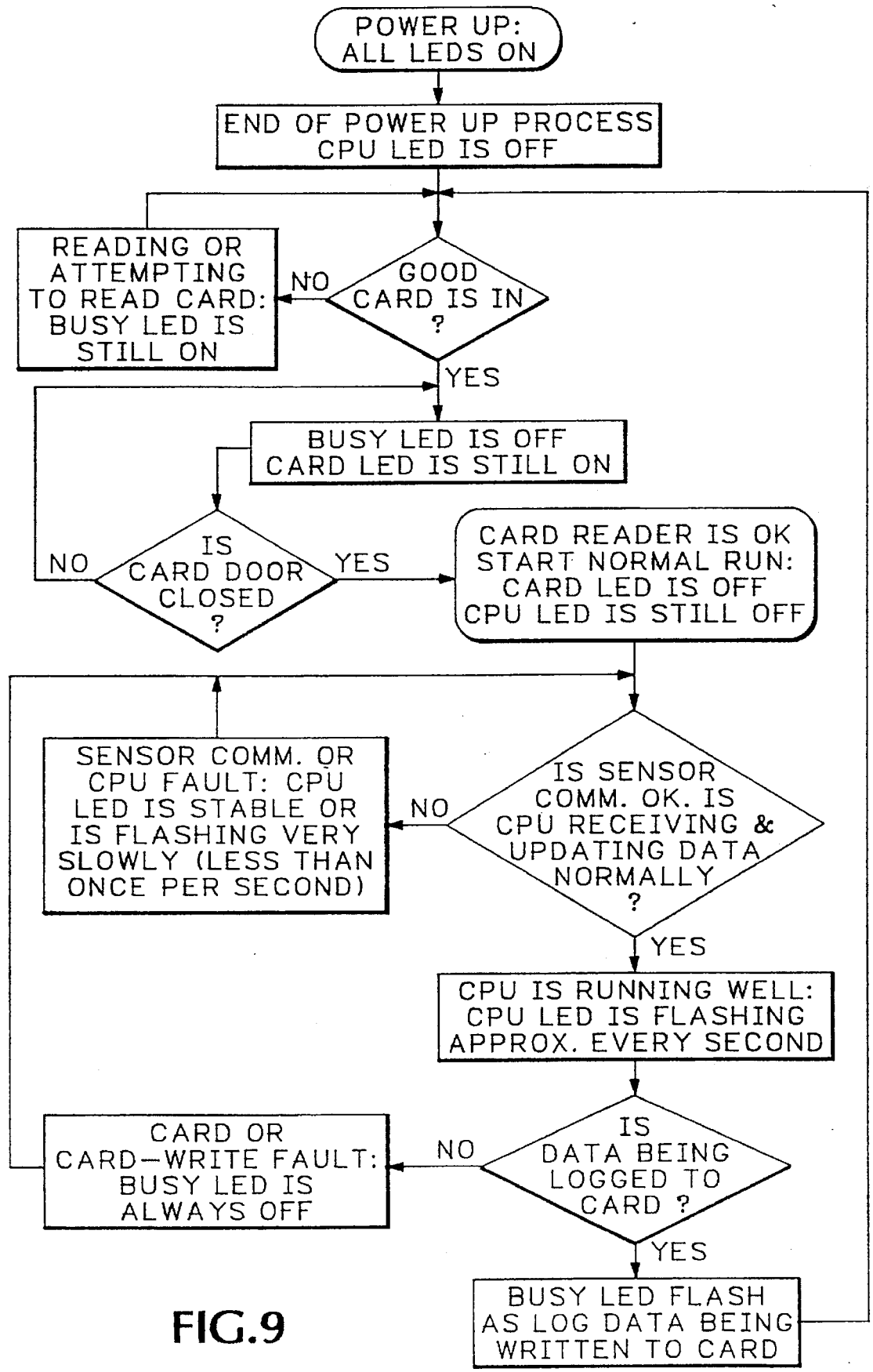
FIG. 9 is a logic flow diagram of a computer program for a power up test.

FIGS. 7–9 represent flow diagrams of the computer software used in the present invention. FIG. 7 shows the power up and boot routines which are run when the system is first turned on. The system can be invoked by the insertion of a PCMCIA card 32 into the card reader 30. The power up and boot routine first loads the operating system, drivers and tasks and then runs the foreground tasks, all of which are stored in EPROM. The software then checks for the integrity of the card and reads in initialization information, loads and initializes the CPU 14. The program then goes into a loop that checks the sensor communications and scans and reads sensor channels as dictated by a task schedule.

The task scheduler, shown in FIG. 8, reads and processes tasks, and also checks for exceptional events such as a power failure, an open card door, a communication link problem, or other exception. The task scheduler is called by the power up boot routine of FIG. 7. FIG. 9 shows a power up routine for checking the card reader and for managing reading and writing to and from the card reader.

Weigh System Program

Figure 23A:
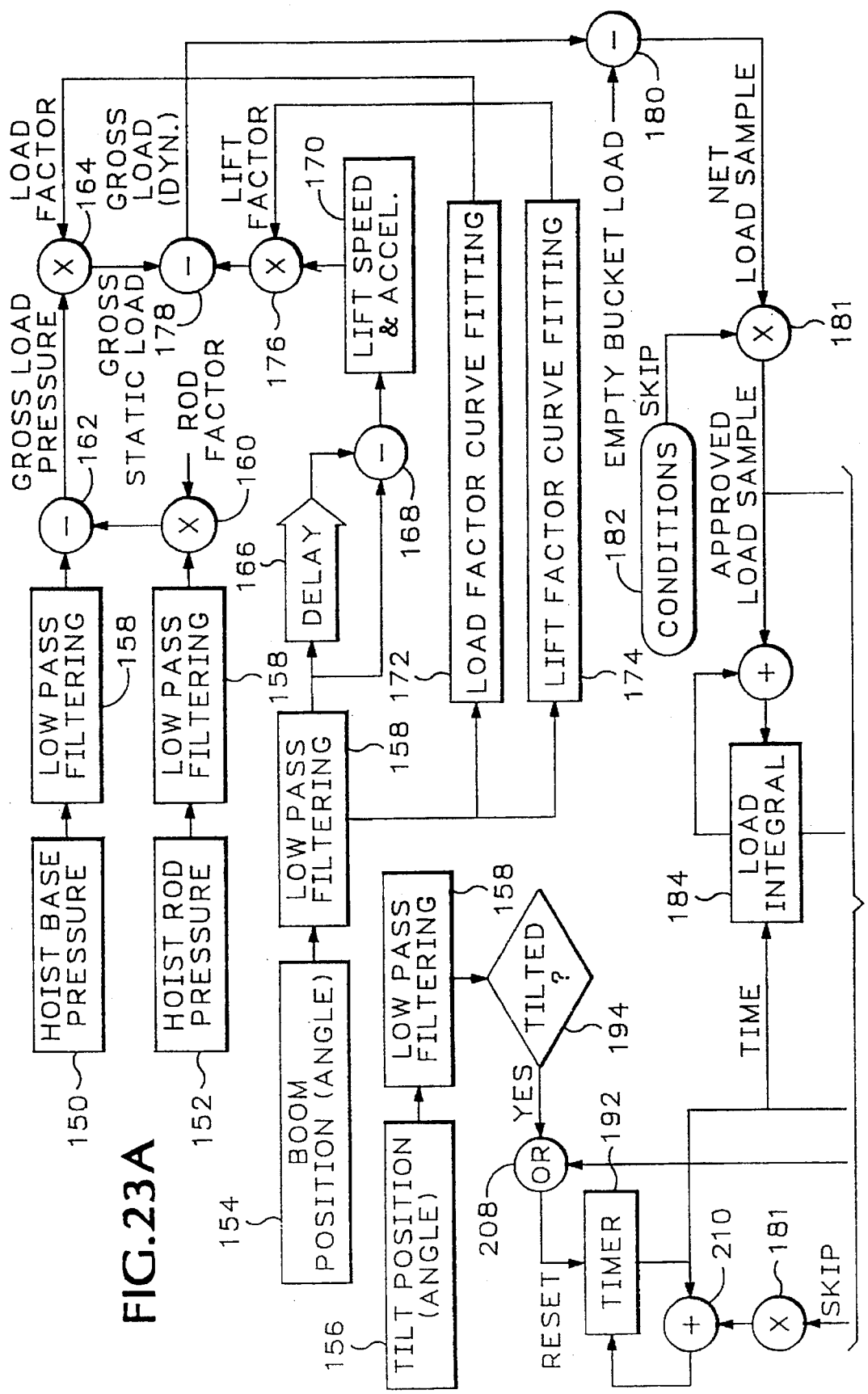
FIGS. 23a and 23b are a preferred embodiment of a flow chart of program logic of a weighing system software program of the present invention.
Figure 23B:
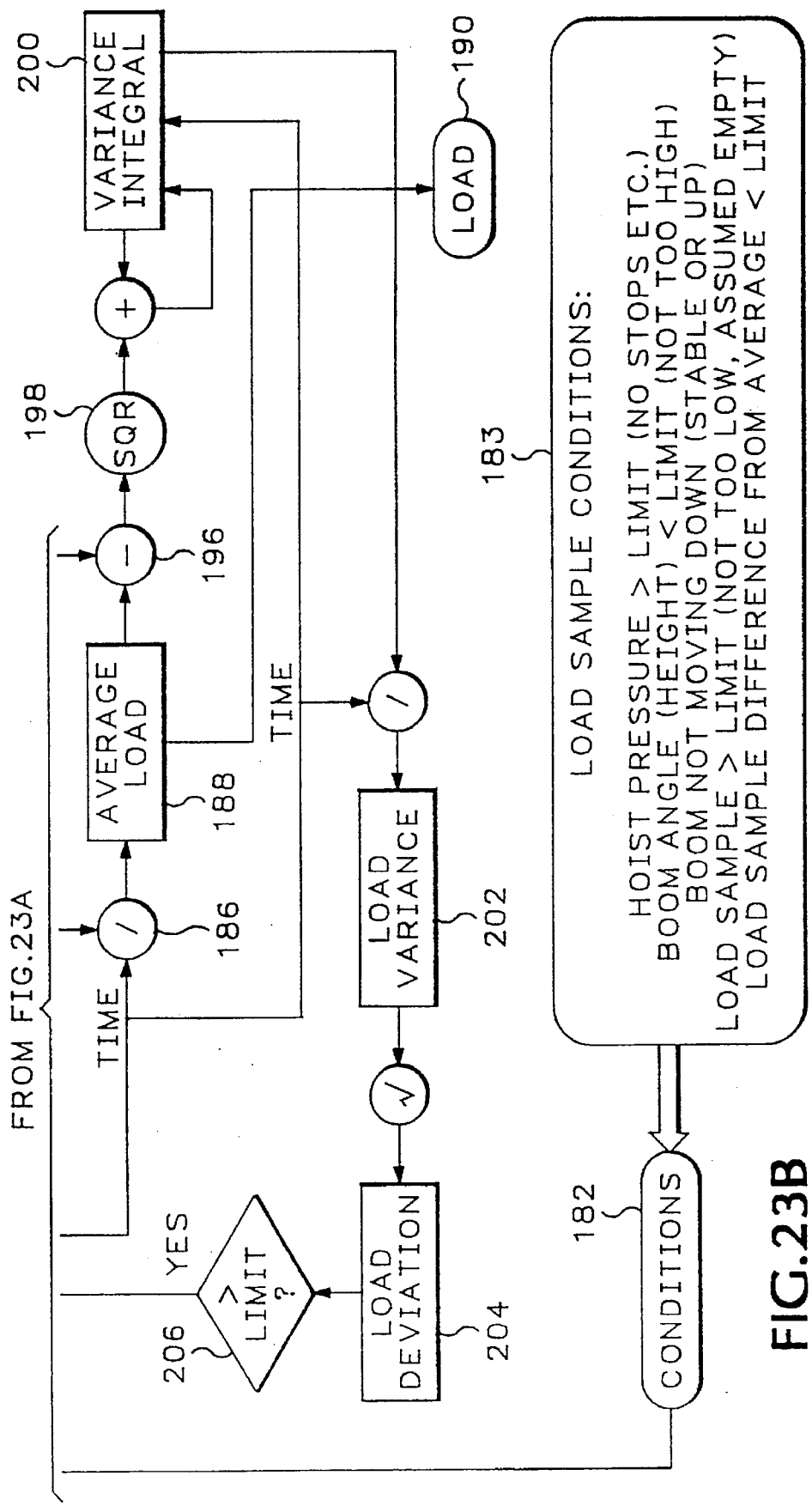

A logic chart for the weigh system program is shown in FIG. 23. The payload weight is determined by output from four sensor inputs: hoist base pressure 150; hoist rod pressure 152; boom position 154; and tilt position 156. The hoist base pressure is the pressure at the base end 101 of the hoist cylinder 100 which is sensed by pressure transducer 22c, as shown in FIG. 22. The hoist rod pressure is the pressure at the rod end 102 of the hoist cylinder 100 and is sensed by pressure transducer 22b. The boom position is the output of the hoist position sensor 110 which measures the angular position of the boom 128. The tilt position is the output from the tilt position sensor 112, which is connected to the stabilizer cylinder 114. The electrical signals from all four sensors are subjected to low pass filtering at 158 to remove noise and high frequency transients associated with impulse loads on the dump bucket caused by the vehicle moving over a rough terrain.

After the low pass filter 158, the hoist rod pressure 152 (hereinafter designated "$P_R$") is multiplied by a rod factor ("$F_R$") at 160. Thereafter, the hoist base pressure 150 ("$P_B$") is subtracted at 162 from the product of the rod pressure $P_R$ and the rod factor $F_R$, yielding the gross load pressure ("G"). Thereafter, the gross load pressure G is multiplied at 164 by a load factor ("$F_L$") to yield a gross static load ("$G_S$").

Returning to the boom position 154, that information is passed through the low pass filter 158 and thereafter sent simultaneously to a delay 166 and a subtractor 168 which subtracts the position of the boom at time $T_N$ from the position of the boom at time $T_{N-1}$ where N correlates with the sampling rate of the sensor values. Because the sample rate N is known by the system, the difference in the boom position at the two times can be used to calculate the speed and acceleration of the boom at 170.

The filtered output of the boom position 154 is also provided to a curve-fitting routine 172 to determine the load factor $F_L$ which is multiplied by the gross load pressure G at 164. The filtered output of the boom position 154 is also provided to a different curve-fitting routine 174 to determine a lift factor which is then multiplied by the lift speed at 176. Thereafter, the product of the lift speed and lift factor is subtracted from the gross static load $G_S$ at 178 to produce the gross dynamic load $G_D$.

The above-mentioned factors (rod factor $F_R$, load factor $F_L$ and lift factor) are based upon empirical test results. Testing has shown that the sensors' weighing response was not linear at different boom positions. That is, a constant load in the bucket 124 would produce sensor outputs at different boom angles that were not equal or proportional. Thus, repeated tests were performed using a known constant load that was raised and lowered by the boom as the sensor output was measured.

The load factor and lift factor were calculated by plotting hoist pressure versus angle for a known load. It is possible to approximate the resulting non-linear response by two linear relationships which meet at a break point at a "break angle" approximately midway through the range of motion of the boom 128. Using the fully down position of the bucket 124 as a zero degree reference, it has been determined that the break angle is approximately 40 degrees for the type of vehicle represented in FIG. 18. Other vehicle configurations would likely have different break angles. Thus, for angles below the break angle, the load factor is equal to the product of the boom position angle times a first weight factor constant. For angles greater than the break angle, the load factor is equal to the product of the boom position angle times a second weight factor constant.

Alternatively, instead of approximating the factors with linear relationships, the empirical results could be stored in a look up table for use by the program.

The rod factor was determined by repetitive trials with a constant known weight. The rod factor $F_R$ was adjusted until the result of the equation of the base pressure minus rod pressure times rod factor ($P_B-P_RF_R$) equaled a constant.

When the boom angle is a constant, the output of the lift speed and acceleration 170 will be zero, and thus the gross static load $G_S$ will be equal to the gross dynamic load $G_D$.

From the gross dynamic load $G_D$, the empty bucket weight is subtracted at 180, producing a net load sample.

The weighing program is continuously testing a series of conditions known as load sample conditions, represented at 182. The conditions include whether the hoist rod pressure 152 exceeds a maximum limit. Another load sample condition is whether the boom angle is below a certain limit because when the boom is too high, the sensor output is unreliable for use in calculations. Also, the boom must be moving up or be stationary in order for the calculations to have significance. The sensor output when the boom is moving down cannot be used in calculating the payload weight. Another condition that must be met is that the net load sample must exceed a minimum weight, otherwise the bucket will be assumed empty. Also, the net load sample must be approximately equal to the average load from previous measurements, otherwise the data will be considered unreliable. If any of the above conditions are not met, a skip signal comprising a logical ∅ will be sent to the multiplier 181, which will cancel out the corresponding net load sample. However, if all of the conditions are met, the net load sample is multiplied by logical 1 and becomes an approved load sample, which gets summed as a load integral at 184.

The load integral 184 is divided by the time at 186 to produce an average load 188. The average load is deemed the most probable actual payload weight and is output as the payload weight at 190 and stored on card 30 as part of the operational log of the vehicle.

The time variable comes from a timer 192. The timer is reset whenever the bucket 124 has been tilted as determined by the output of the tilt position 156 and a "tilted?" decision block 194.

Returning to the average load 188, that value is subtracted from the approved load sample at 196 and squared at 198 and thereafter integrated at 200 to produce a load variance integral. The load variance integral is averaged over time to produce a load variance 202. The square root of the load variance produces a standard deviation of the load at 204, which is compared to an allowable limit at 206. When the standard deviation exceeds the limit, a logical 1 is sent to the OR block 208 and causes the timer 192 to reset.

The load sample conditions also act to subtract time from the timer in the event of a skip condition. Thus, as noted, a non-skip condition will output a logical 1, which will be added to the time at 210. However, if a skip condition occurs, the condition block 182 will output a logical ∅ which will be added to the timer at 210, thus causing the timer to miss an increment for skip conditions.

As noted above, the software is part of a vehicle monitoring system provided by the Vehicle Monitoring Corporation of Redmond, Wash. The programming is provided in a script language. The script language program for the weighing function is provided at Appendix A and the script language program for the entire computer monitoring system is shown in Appendix B.

The script program defines a sample rate of 20 Hz with a transfer rate of five Hz and an update rate of one cycle per second. Accordingly, for the present system, the sensors are sampled 20 times per second, the average sensor values are transferred to the CPU 14 five times a second, and the information on the display 12 is updated every second.

The script program lists the attributes and calculations for each sensor separately as channels S1 . . . S79. There are two types of channels. The first are channels designated as sensor ports S1 . . . S39, which relate to actual sensor values such as the electrical signals provided by the temperature sensors 20 or the position sensors 110 and 112. The second type of channels are pseudo-sensors S40 . . . S79, which represents a calculated value based upon two or more sensor inputs or other pseudo-sensors channels.

The value of the sensors is calculated on a line labeled "value formula." The actual formula is presented in reverse Polish notation format using script variables and operators. The output of an operation may be either numerical or logical and logical results may be used as numerical operands. The operators include numerical operators +, −, *, /, % and the logical operators &, \, !, |, where & is the logical AND, ! is the logical NOT, and | is the logical OR. The \ is integer division. The % is MODULO. In addition, the script formulas include a { for duplicate and store, a } for exchange with store, and the operator separators "," and ";"Thus, the formula "S4,S3,+;230,>" translates to mean that the values of the sensors S3 and S4 are added together to produce a numerical result which is compared to the number 230 under the logical operation of > to produce a logical result.

Division by zero is permitted and is processed such that MODULO zero will generate zero; real and integer division by zero will produce $10^{38}$ (the largest byte float number), except that zero divided by zero is zero.

The literal "v" (or "V") in a sensor channel value formula is the result of the sensor's unscaled raw value transmitted by the sensor manager 16, and multiplied by a script scaling linear gain, added to a script's adjusting linear offset and/or converted via a script's non-linear look-up table, if it is non-linear. The interpretation of the literal "v" (or "V") in a pseudo-channel value formula is the old channel's value from a previous scan, that is, its previous value. The interpretation of the literal "v" (or "V") in a channel event state formula is a computed value of the channel itself, which has been determined by its scripted value formula.

The interpretation of the literal "e#" (or "E#"), where "#" is a channel number, in a value formula is that channel's event formula from the previous scan.

It will be noted in the beginning portion of the script program that some of the sensor and pseudo-sensor channels are given an initial value of 52, which relates to filtering. Filtering is performed by a recursive filtering formula: $V_I = V_{I-1}(1-2^n) + 2^n S_I$, where $V_I$ is the filtered value, $V_{I-1}$ is the previous filtered value, $S_I$ is the new value, and $2^n$ is approximately equal to $F_S T$, where $F_S$ is the sample frequency and T is the filter time constant. Thus, for a preferred sample rate and frequency of $F_S = 100$ Hz and a filter time $T \approx 0.3$ seconds, $2^n \approx 30$ and n=5. Thus, the initialization value 52 correlates with the n exponent of 5 and the "2" is an indication to the program that the channel is filtered.

Displays

Figure 10:
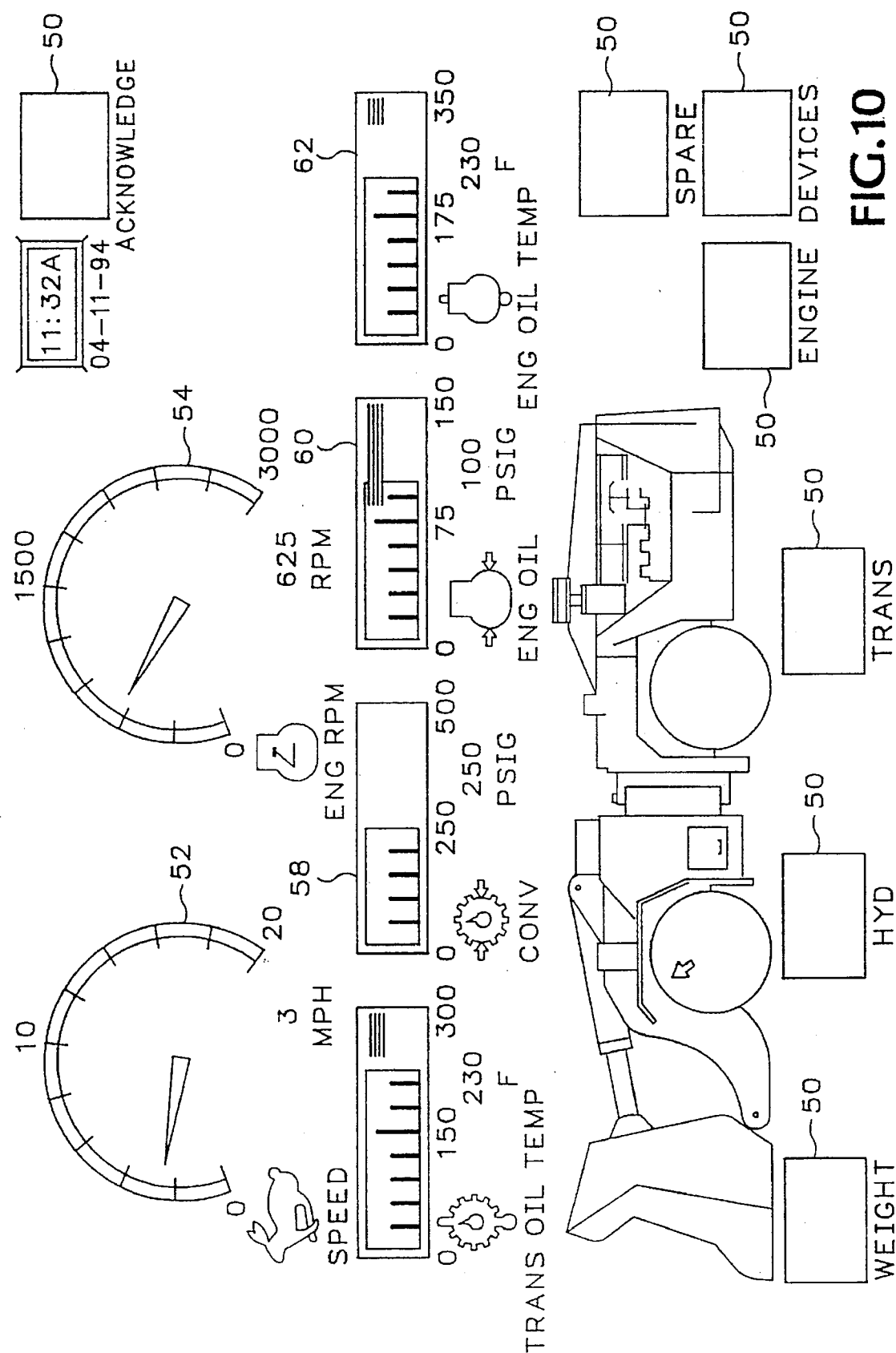
FIG. 10 is a preferred embodiment of a main screen displayed on a computer monitor for communicating various engine and vehicle parameters to a vehicle operator.

Preferably, the system will display vehicle and engine data to the vehicle operator on the display 14 which includes a touch sensitive screen. FIG. 10 shows a preferred embodiment of a main screen showing vehicle parameters and providing a plurality of touch keys 50 that the operator can touch on the display 14 to obtain different screens having different information. The main screen shown in FIG. 10 displays vehicle speed 52, engine RPM 54, transmission oil temperature 56, torque converter pressure 58, engine oil pressure 60, and engine oil temperature 62.

Figure 11:
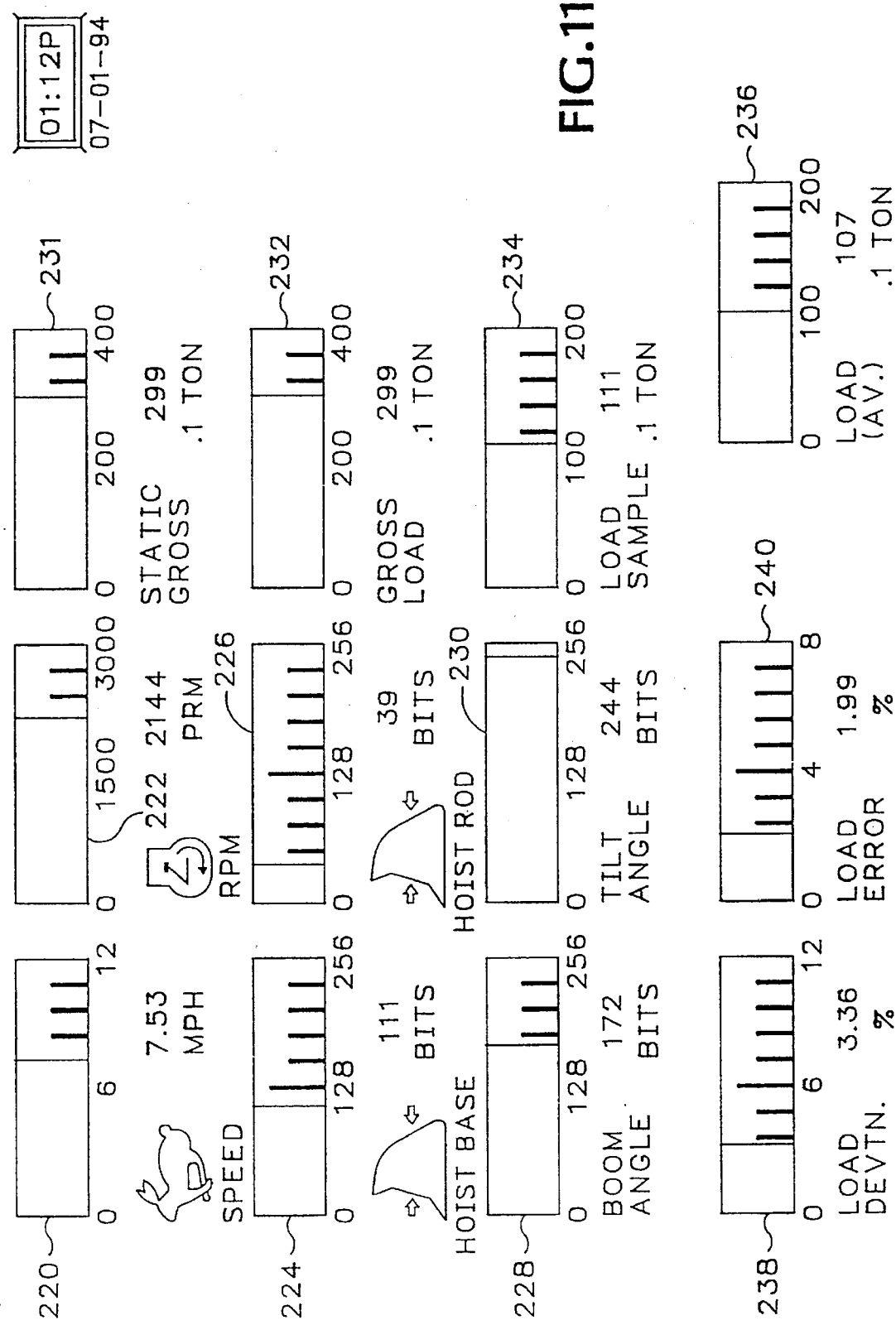
FIG. 11 is a preferred embodiment of a computer screen for showing payload information.

When the operator presses touch key 50 labeled "Weigh" the computer software will call up the screen shown in FIG. 11. This screen shows various attributes associated with the load being carried by the vehicle. The weigh screen shown in FIG. 11 shows vehicle speed and engine rpm at 220 and 222, respectively. The screen also includes thermometer-type indicators for hoist base pressure 224, hoist rod pressure 226, boom angle 228 and tilt angle 230. The load is shown as a static gross load 231, a gross load 232, load sample 234 and a load average 236. In addition, the screen shows the load deviation 238 and load error 240.

Figure 12:
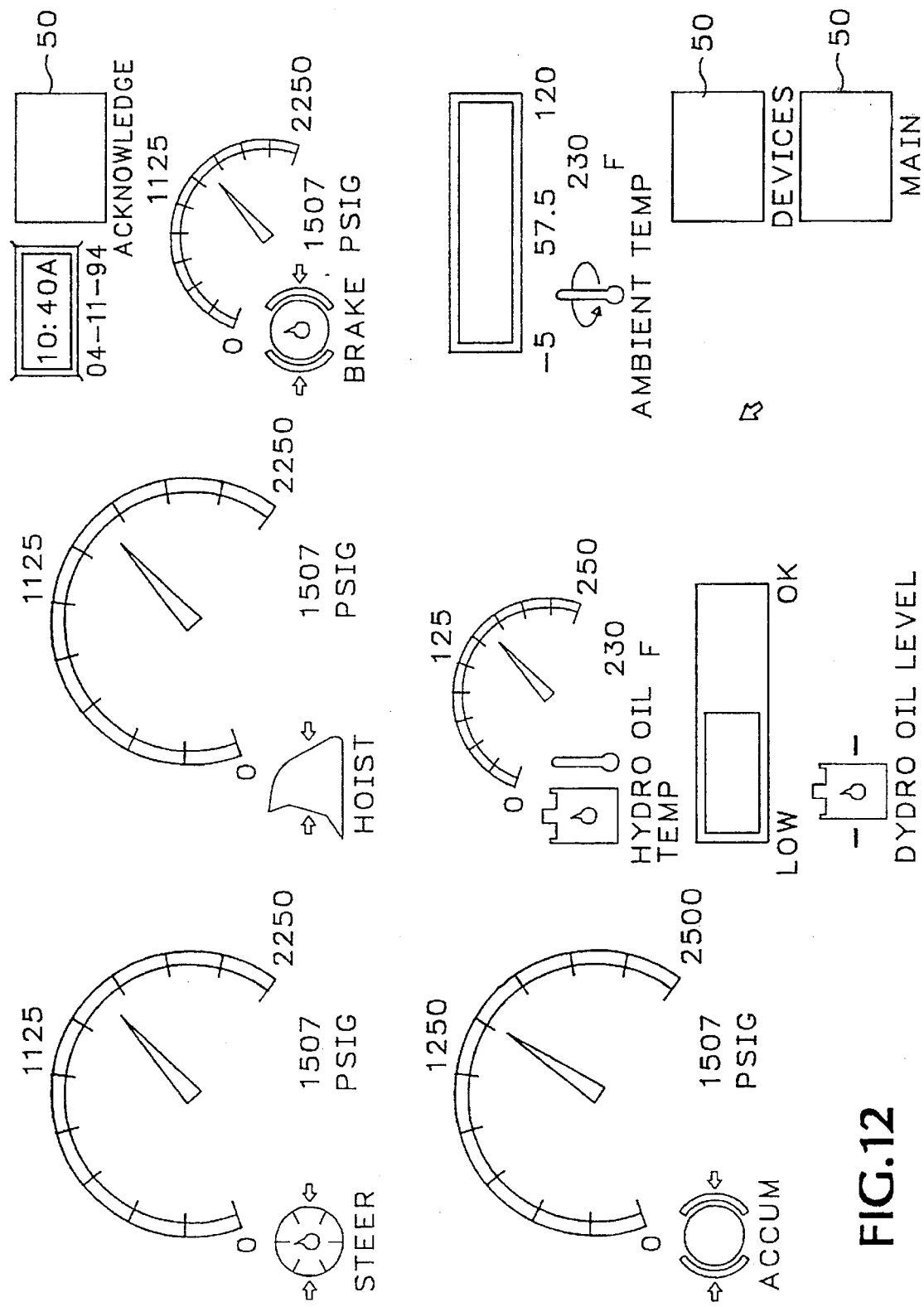
FIG. 12 is a preferred embodiment of a computer screen for showing hydraulic system information.
Figure 13:
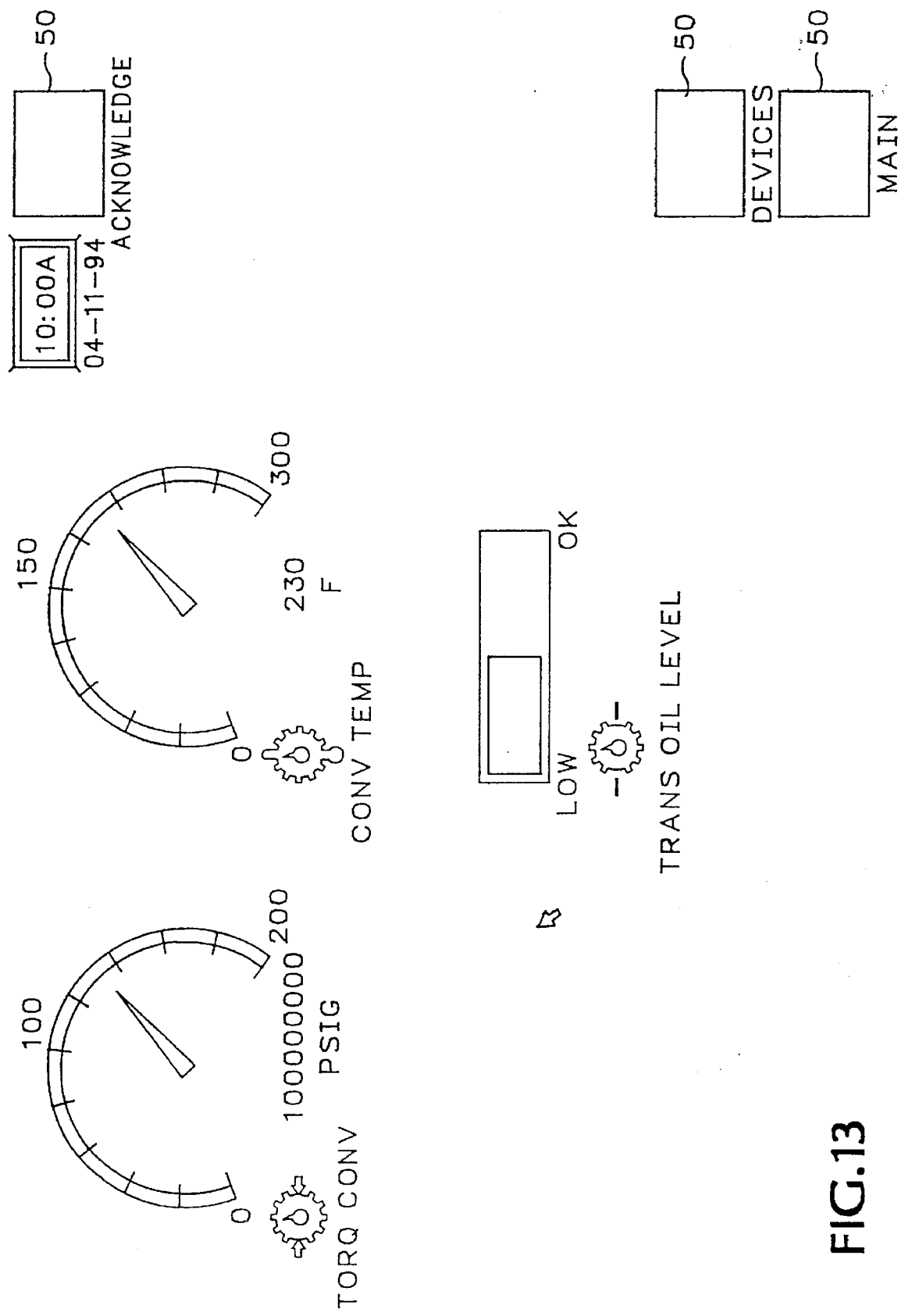
FIG. 13 is a preferred embodiment of a computer screen for communicating information regarding a transmission/torque converter system.
Figure 14:
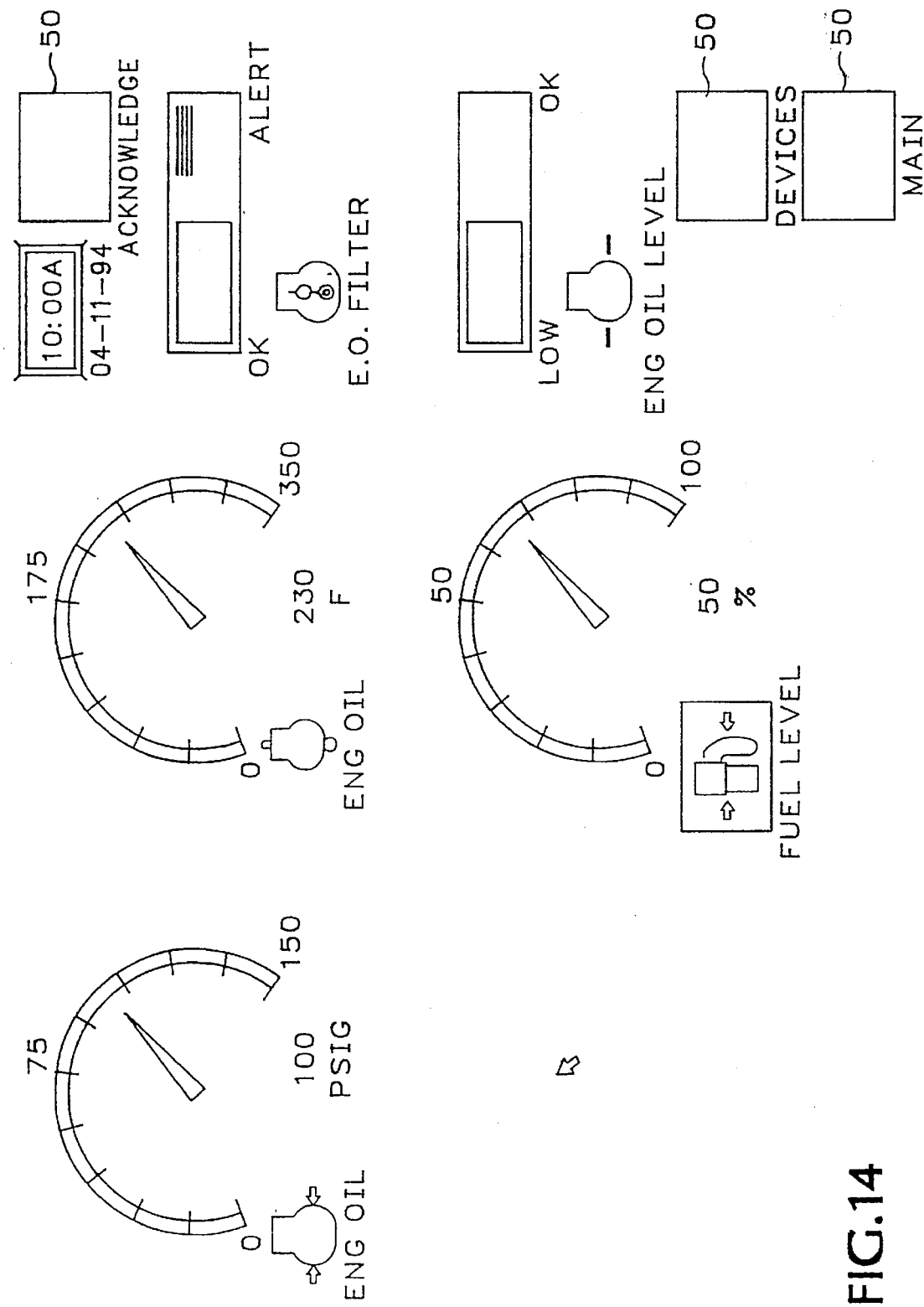
FIG. 14 is a preferred embodiment of a computer screen for showing data pertaining to an engine.
Figure 16:
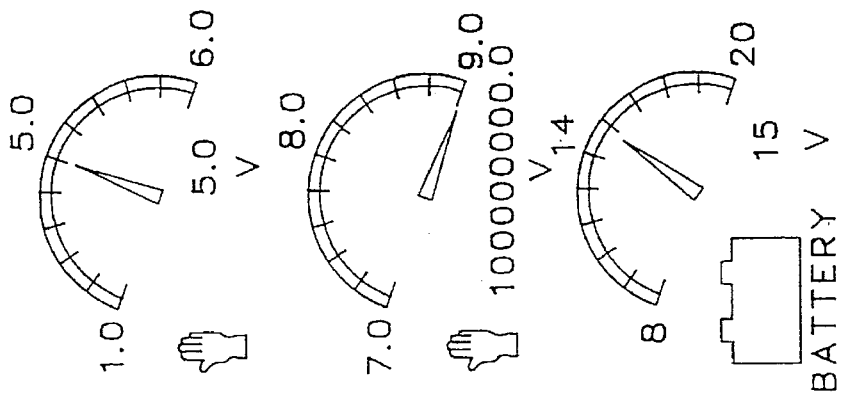
FIG. 16 is a preferred embodiment of a computer screen for showing information regarding diagnostics for the vehicle.

From the main screen, pressing the touch key 50 labeled "Hyd" will take the operator to the screen shown in FIG. 12 which displays various information associated with the hydraulic system. From the main screen the operator can press touch key 50 labeled "Trans" and the computer will call up a screen shown in FIG. 13 to display information regarding the transmission system. If the operator pushes touch key 50 labeled "Engine" from the main screen, the computer will call up the screen shown in FIG. 14 which displays various information regarding the engine. In a like manner, if the operator presses the touch key 50 labelled "Devices" the display will change to that shown in FIG. 15. FIG. 16 shows a diagnostic screen that can be accessed by repair personnel for displaying various information regarding the engine and the vehicle.

Having described the various parts and components of the preferred embodiments of the present invention, the overall operation of the system will now be described.

System Operation

The computer monitoring system 10 of the present invention is an electronic data acquisition and storage system that is mounted on mobile mining vehicle 70 such as is shown in FIG. 18 or on heavy construction equipment. The system is activated by inserting a card 32 into the card reader 30 and closing a door to the card reader. The CPU 14 begins a boot routine and then initializes the system with information read from the card. The system 10 then begins monitoring important vehicle operating parameters and compares the output of sensors against a high limit and a low limit. If a reading exceeds one of the predetermined limits a warning results and the CPU sends a message to the operator regarding the out-of-limit condition. The operator must acknowledge the warning by pressing the "Acknowledge" touch key 50 on the display 14. If the reading is outside a critical limit, the operator is advised to cease operation of the vehicle or alternatively, the monitoring system 10 can shut down the vehicle system.

In addition to the real time display of information, all data is stored with respect to time of day and date. Preferably, the sensor data is stored on the PCMCIA card 32 for easy portability to other computers for use by management and repair personnel in determining the operating efficiency of the vehicle and the operator.

Preferably, the card reader 30 and card 32 have the capacity to accumulate trend and sensor information throughout an entire work cycle for one operator. The system will sample sensor information according to a predetermined sample rate, which sample rate will effect the length of time over which information can be stored on a card 32. The sample rate is selectable between 0.001 and 1000 samples per second. Obviously, a higher sample rate means a greater amount of information is generated per hour and therefore fewer hours of information may be stored. Alternatively, a lower sample rate means that less information would be sampled per hour and therefore a greater number of hours may be stored on the card 32. When the card is filled with information and new information is being generated, then the oldest information will be discarded to make room for the new incoming information. In this manner it is possible for the operator to continuously use a card 32 without the need for manually erasing information or using new cards.

Should an exception or system failure occur the card 32 would have information from the last eight to ten hours of operation stored thereupon.

Because of the memory capabilities of the card 32 it can also serve as a time card to log the time worked by the operator and additionally it may serve as a security device to ensure that the vehicle is operated only by operators who have cards that are approved for that particular vehicle.

Figure 17:
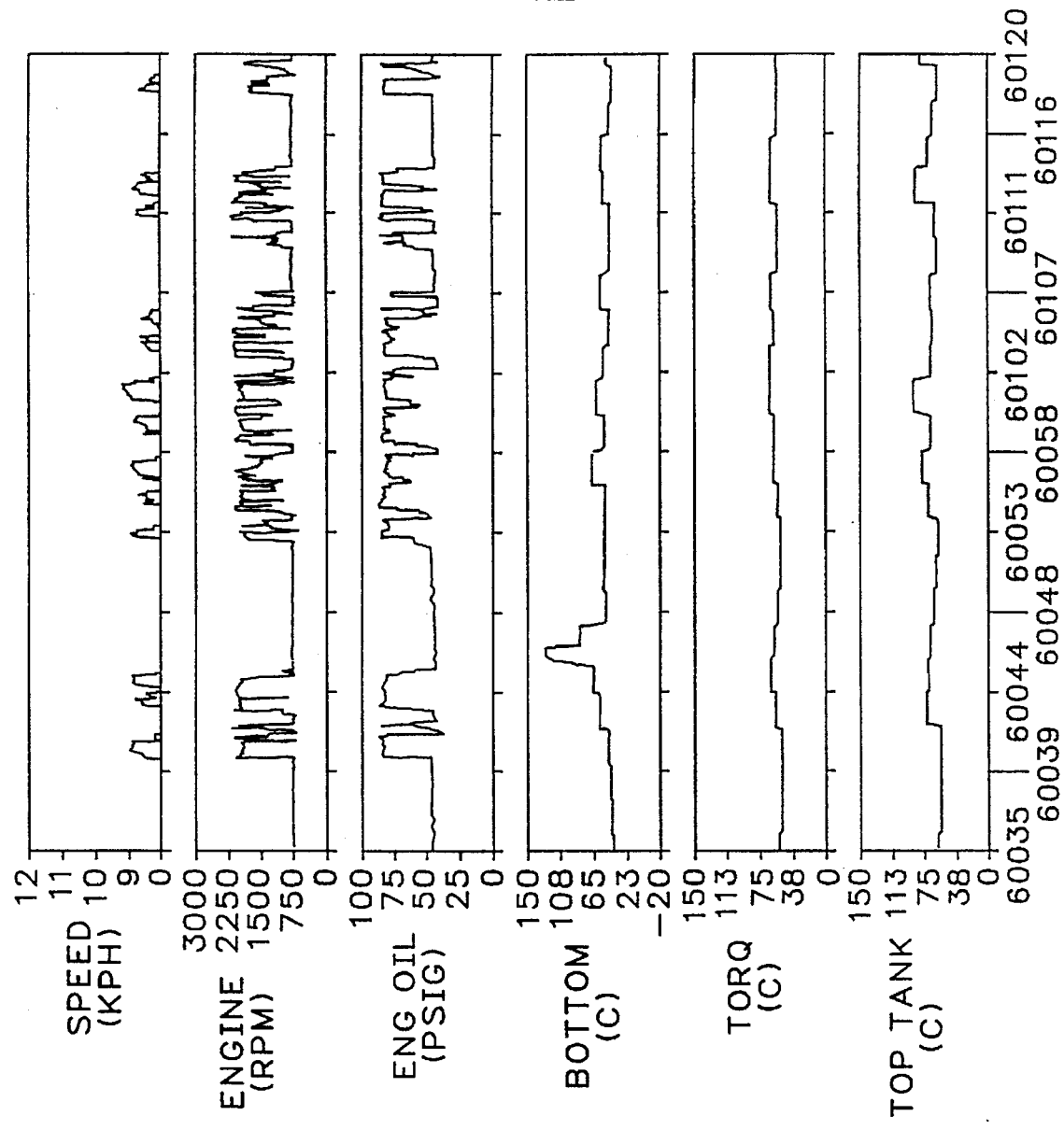
FIG. 17 is a representation of an output of the data acquisition system of the presenting invention showing the output of six parameters verses time.

The data that is gathered may be analyzed on a desk top computer. The data may be used to generated histograms and strip charts as shown in FIG. 17, or alternatively it may be read into a standard spreadsheet program. The analysis and reporting function will be used by mine management to help understand and control the operation of the vehicle with the goal of optimizing productivity, minimizing maintenance costs and controlling vehicle abuses by the operators.

The weighing system determines and records the payload data while the CPU tracks the number of trips as a function of the time of day and date. When this information is combined with information such as a vehicle speed profile and engine RPM data, the information becomes a powerful profile of the vehicle's operation throughout the work shift.

In view of these and the wide variety of other embodiments to which the principals of the invention can be applied, the illustrated embodiments should be considered exemplary only and not as limiting the scope of the invention.

I claim as the invention all such modifications as may come within the scope and spirit of the following claims and equivalents thereto.

We claim:

1. A weighing system for a vehicle that includes a vehicle body having motive power and an articulated load-carrying portion attached to the body and movable to various positions relative to the body, the system comprising:

(a) a plurality of sensors operatively connected to the load-carrying portion so as to detect at least two parameters associated with the positions of the load-carrying portion relative to the body and outputting at least two electronic signals indicative of the sensed parameters;

(b) a microprocessor;

(c) memory in which there is stored at least one empirically determined factor, the microprocessor being operable to receive the at least two electronic signals outputted by the sensors and use the signals and the at least one factor to calculate a most probable weight of a load in the load-carrying portion; and (d) a recording device operable to receive and record the most probable weight.

2. The weighing system of claim 1 wherein the plurality of sensors includes a load-carrying portion tilt sensor, a load-carrying portion position sensor, and two sensors that detect pressure associated with a hoist cylinder that raises and lowers the load-carrying portion.

3. The weighing system of claim 1 wherein the plurality of sensors includes a load-carrying portion tilt sensor, a load-carrying portion position sensor, and two sensors that detect pressure associated with a hoist cylinder that raises and lowers the load-carrying portion and wherein the at least one empirically determined factor includes a load factor and a lift factor.

4. The weighing system of claim 1 wherein the plurality of sensors includes a load-carrying portion tilt sensor, a load-carrying portion position sensor, and two sensors that detect pressure associated with a hoist cylinder that raises and lowers the load-carrying portion and wherein the at least one empirically determined factor includes a load factor, a lift factor and a rod factor.

5. In an electronic weighing system, a method of calculating a most probable weight of a load in a load-carrying portion of a vehicle, the method comprising the steps:

(a) detecting the position of the load-carrying portion;

(b) detecting pressure in an hydraulic cylinder used for raising the load-carrying portion;

(c) selecting at least one empirically determined factor according to the position of the load-carrying portion;

(d) calculating the most probable weight of a load in the load-carrying portion as a function of the position and the pressure and the factor; and (e) storing the most probable weight in memory.

6. The method of claim 5 further comprising the step of multiplying the pressure by a rod factor.

7. The method of claim 5 wherein the step of selecting at least one empirically determined factor comprises selecting a load factor and selecting a lift factor.

8. The method of claim 5 wherein the step of detecting the position of the load-carrying portion comprises detecting a boom position at a first time and detecting the boom position at a second time and further comprising the step of calculating movement of the load-carrying portion.

9. The method of claim 5 further comprising the step of calculating a net load sample as a function of the position, the pressure, the factor, and a predetermined empty bucket weight.

10. The method of claim 5 wherein the step of detecting the position comprises detecting a position of a boom that is connected to a load-carrying bucket and detecting a position of the bucket.

11. The method of claim 10 further comprising determining whether the bucket has dumped a load by the position of the bucket.

12. The method of claim 5 further comprising timing an interval that a load is being carried in the load-carrying portion.

13. The method of claim 5 wherein the step of detecting the position further includes:

detecting a tilt position of the load-carrying portion to determine whether a load is being carried;

calculating a net load sample from the position, the pressure, and the factor;

(c) timing the length of time a load is carried in the load-carrying portion;

(d) summing the net load sample in a load integral until the tilt position indicates that the load has been dumped; and (e) dividing the summed net load sample by the time to determine a weight of the load in the load-carrying portion.

14. The method of claim 5 further comprising the step of calculating a net load sample and storing the net load sample in a load integral when a load sample condition indicates that at least one parameter associated with the load-carrying portion is within predetermined limits.

15. The method of claim 14 wherein one load sample condition is that the parameter associated with the pressure is greater than a threshold limit.

16. The method of claim 14 wherein one load sample condition is that a bucket associated with the load-carrying portion is below a predetermined height limit.

17. The method of claim 14 wherein one load sample condition is that the bucket is not moving down.

18. The method of claim 14 wherein one load sample condition is that the net load sample is greater than a predetermined limit.

19. The method of claims 14 further comprising the step calculating an average weight of the load in the load-carrying portion for a plurality of loads and wherein one load sample condition is that a difference between the net load sample and the average weight is below a predetermined limit.

20. In a weighing system, a method of calculating a most probable weight in a load-carrying portion of a vehicle, comprising the steps:

(a) detecting a position of the load-carrying portion;

(b) selecting a lift factor based on the position;

(c) calculating a speed of the load-carrying portion by comparison of the position at different times;

(d) detecting pressure in a hydraulic cylinder used for raising and lowering the load-carrying portion;

(e) calculating the most probable weight in the load-carrying portion from the speed of the load-carrying portion and the pressure; and (f) storing the most probable weight of at least two loads in memory.

21. In a weighing system, a method of calculating a most probable weight in a load-carrying portion of a vehicle, comprising the steps:

(a) detecting a position of the load-carrying portion;

(b) selecting a load factor based on the position;

(c) calculating a speed of the load-carrying portion by comparison of the position at different times;

(d) detecting pressure in a hydraulic cylinder used for raising and lowering the load-carrying portion;

(e) calculating the most probable weight in the load-carrying portion from the speed of the load-carrying portion and the pressure; and (f) storing the most probable weight of at least two loads in memory.

22. In a weighing system, a method of calculating a most probable weight in a load-carrying portion of a vehicle, comprising the steps:

(a) detecting a position of the load-carrying portion;

(b) calculating a speed of the load-carrying portion by comparison of the position at different times;

(c) detecting pressure in a hydraulic cylinder used for raising and lowering the load-carrying portion;

(d) selecting a rod factor based on the pressure; and (e) storing the most probable weight of at least two loads in memory.

* * * * *